United States Patent
Kunimi et al.

(10) Patent No.: US 11,039,039 B2
(45) Date of Patent: Jun. 15, 2021

(54) APPARATUS, SYSTEM, AND PRODUCT FOR CONVERTING DESIGNATED IMAGE AREA WITH OBJECT FOR PRINTING IN A SPOT COLOR INTO PRINTING DATA

(71) Applicants: Keiji Kunimi, Kanagawa (JP); Yutaka Ataku, Kanagawa (JP); Noboru Tamura, Kanagawa (JP); Ryo Kobayashi, Kanagawa (JP); Hiroki Matsuura, Tokyo (JP); Yoshio Taga, Kanagawa (JP); Kaname Nomura, Kanagawa (JP)

(72) Inventors: Keiji Kunimi, Kanagawa (JP); Yutaka Ataku, Kanagawa (JP); Noboru Tamura, Kanagawa (JP); Ryo Kobayashi, Kanagawa (JP); Hiroki Matsuura, Tokyo (JP); Yoshio Taga, Kanagawa (JP); Kaname Nomura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/844,232

(22) Filed: Apr. 9, 2020

(65) Prior Publication Data
US 2020/0336622 A1   Oct. 22, 2020

(30) Foreign Application Priority Data

Apr. 18, 2019 (JP) .............................. JP2019-079624

(51) Int. Cl.
*H04N 1/60* (2006.01)
*H04N 1/54* (2006.01)
(Continued)

(52) U.S. Cl.
CPC .......... *H04N 1/6027* (2013.01); *B41J 2/2114* (2013.01); *G03G 15/6585* (2013.01);
(Continued)

(58) Field of Classification Search
None
See application file for complete search history.

(56) References Cited

U.S. PATENT DOCUMENTS 7,561,305 B2 *  7/2009  Kitagawara .......... H04N 1/6005
                                                       358/1.9
7,995,238 B2 *  8/2011  Nishide .................... H04N 1/52
                                                       358/1.9
(Continued)

FOREIGN PATENT DOCUMENTS

EP        2144154 A2      1/2010
JP      2006-038933       2/2006
(Continued)

OTHER PUBLICATIONS

Extended European Search Report dated Sep. 16, 2020 issued in corresponding European Appln. No. 20169338.9.

*Primary Examiner* — Scott A Rogers
(74) *Attorney, Agent, or Firm* — Harness, Dickey & Pierce, P.L.C.

(57) ABSTRACT

There is provided an image forming apparatus for performing printing in a plurality of colors. The image forming apparatus includes processing circuitry. The processing circuitry is configured to receive first print data in which an object to be printed in a spot color is designated in a first area in a document to be printed and second print data of the document to be printed from an information processing apparatus; convert the second print data received by the communication unit into image data of a predetermined color; extract an image of the first area from the image data obtained by conversion of the drawing unit; convert the image of the first area extracted by the spot color image control unit into the spot color; and generate image data of
(Continued)

the spot color in which the image of the first area converted by the conversion unit is placed.

13 Claims, 20 Drawing Sheets

(51) Int. Cl.
  *H04N 1/00* (2006.01)
  *B41J 2/21* (2006.01)
  *G03G 15/00* (2006.01)

(52) U.S. Cl.
  CPC ....... *H04N 1/0044* (2013.01); *H04N 1/00482* (2013.01); *H04N 1/54* (2013.01); *H04N 1/6008* (2013.01); *H04N 1/6072* (2013.01)

(56) References Cited

U.S. PATENT DOCUMENTS

| | | |
|---|---|---|
| 10,237,436 B1 | 3/2019 | Das |
| 2010/0302588 A1 | 12/2010 | Ohno |
| 2014/0078525 A1* | 3/2014 | Hara .................. H04N 1/6016 358/1.9 |
| 2015/0078769 A1 | 3/2015 | Kogusuri |

FOREIGN PATENT DOCUMENTS

| | | |
|---|---|---|
| JP | 2007-304799 | 11/2007 |
| JP | 2013-239204 | 11/2013 |

* cited by examiner

FIG. 14A

```
[
  {
    "src_x": "100",
    "src_y": "100",
    "width": "200",
    "height": "200",
    "dst_x": "550",
    "dst_y": "750",
    "dst_width": "300",
    "dst_height": "300",
    "rot": "30",
  },
  {
    "src_x": "500",
    "src_y": "500",
    "width": "700",
    "height": "800",
    "dst_x": "550",
    "dst_y": "1100",
    "dst_width": "700",
    "dst_height": "800",
    "rot": "0",
  },
  ... ADD BY NUMBER OF AREAS TO BE PRINTED IN SPOT COLOR
]
```

D1, D2

(a)          (b) NO OVERPRINT DESIGNATION          (c) OVERPRINT DESIGNATION

APPARATUS, SYSTEM, AND PRODUCT FOR CONVERTING DESIGNATED IMAGE AREA WITH OBJECT FOR PRINTING IN A SPOT COLOR INTO PRINTING DATA

CROSS-REFERENCE TO RELATED APPLICATION

This patent application is based on and claims priority pursuant to 35 U.S.C. § 119(a) to Japanese Patent Application No. 2019-079624, filed on Apr. 18, 2019, in the Japan Patent Office, the entire disclosure of which is hereby incorporated by reference herein.

BACKGROUND

Technical Field

Aspects of the present disclosure relate to an image forming apparatus, an information processing apparatus, a printing system, a printing method, and a storage medium.

Related Art

Toner used for image formation in a laser printer or the like is required to have various characteristics from the viewpoint of developing, transfer, fixing, image quality, and the like. For example, a technique of forming an image using a toner that reflects or absorbs light having a specific wavelength has been proposed. In the technique, an infrared absorber is mixed with a toner, such as cyan, magenta, yellow, and black (C, M, Y, and K), to form an image.

However, such a technique has a disadvantage that printing using a spot color requires application software capable of designating the spot color and an image forming apparatus corresponding to the designation of the spot color but applications supporting the printing using spot color are limited. A document displayed on a display by an information processing apparatus expresses colors by an additive and subtractive color mixing (red, green, blue (RGB)). For this reason, application software that operates on the information processing apparatus generally forms an image in RGB. Since a document in which colors are expressed in RGB is converted into CMYK at the time of printing and printed, general application software cannot handle a spot color. Some image processing application software can handle a document by adding a spot color separately from RGB, but introduction or learning of such application software requires a lot of cost.

SUMMARY

In an aspect of the present disclosure, there is provided an image forming apparatus for performing printing in a plurality of colors. The image forming apparatus includes processing circuitry. The processing circuitry is configured to receive first print data in which an object to be printed in a spot color is designated in a first area in a document to be printed and second print data of the document to be printed from an information processing apparatus; convert the second print data received, into image data of a predetermined color; extract an image of the first area from the image data obtained by conversion of the second print data; convert the image of the first area extracted, into the spot color; and generate image data of the spot color in which the image of the first area converted is placed.

In another aspect of the present disclosure, there is provided an information processing apparatus configured to request printing of a document displayed by application software to an image forming apparatus. The information processing apparatus includes processing circuitry. The processing circuitry is configured to receive an object to be printed in a spot color by designation of a first area in a document to be printed; convert information regarding the first area into first print data in which the object to be printed in the spot color is designated in the first area in the document to be printed; convert the document to be printed into second print data; and transmit the first print data and the second print data to the image forming apparatus.

In still another aspect of the present disclosure, there is provided a printing system that includes an information processing apparatus and an image forming apparatus. The information processing apparatus is configured to request printing of a document displayed by application software to the image forming apparatus. The information processing apparatus includes processing circuitry. The processing circuitry is configured to receive an object to be printed in a spot color by designation of a first area in a document to be printed; convert information regarding the first area into first print data in which the object to be printed in the spot color is designated in the first area in the document to be printed; convert the document to be printed into second print data; and transmit the first print data and the second print data to the image forming apparatus. The image forming apparatus includes processing circuitry configured to receive the first print data and the second print data from the information processing apparatus; convert the second print data received, into image data of a predetermined color; extract an image of the first area from the image data obtained by conversion of the second print data; convert the image of the first area extracted, into the spot color; and generate image data of the spot color in which the image of the first area converted is placed.

In still yet another aspect of the present disclosure, there is provided a non-transitory storage medium storing computer readable program code for causing an information processing apparatus to execute a process of requesting printing of a document displayed by application software to an image forming apparatus. The process includes receiving an object to be printed in a spot color by designation of a first area in a document to be printed; converting information regarding the first area received by the receiving into first print data; converting the document to be printed into second print data; and transmitting the first print data and the second print data to the image forming apparatus.

In still further yet another aspect of the present disclosure, there is provided a printing method for causing an information processing apparatus to execute a program called from application software for displaying a document to request printing the document to an image forming apparatus. The printing method includes receiving an object to be printed in a spot color by designation of a first area in a document to be printed; converting information regarding the first area received by the receiving into first print data; converting the document to be printed into second print data; and transmitting the first print data and the second print data to the image forming apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 14A and 14B are diagrams illustrating examples of area information and area information commands;

Figure 1:
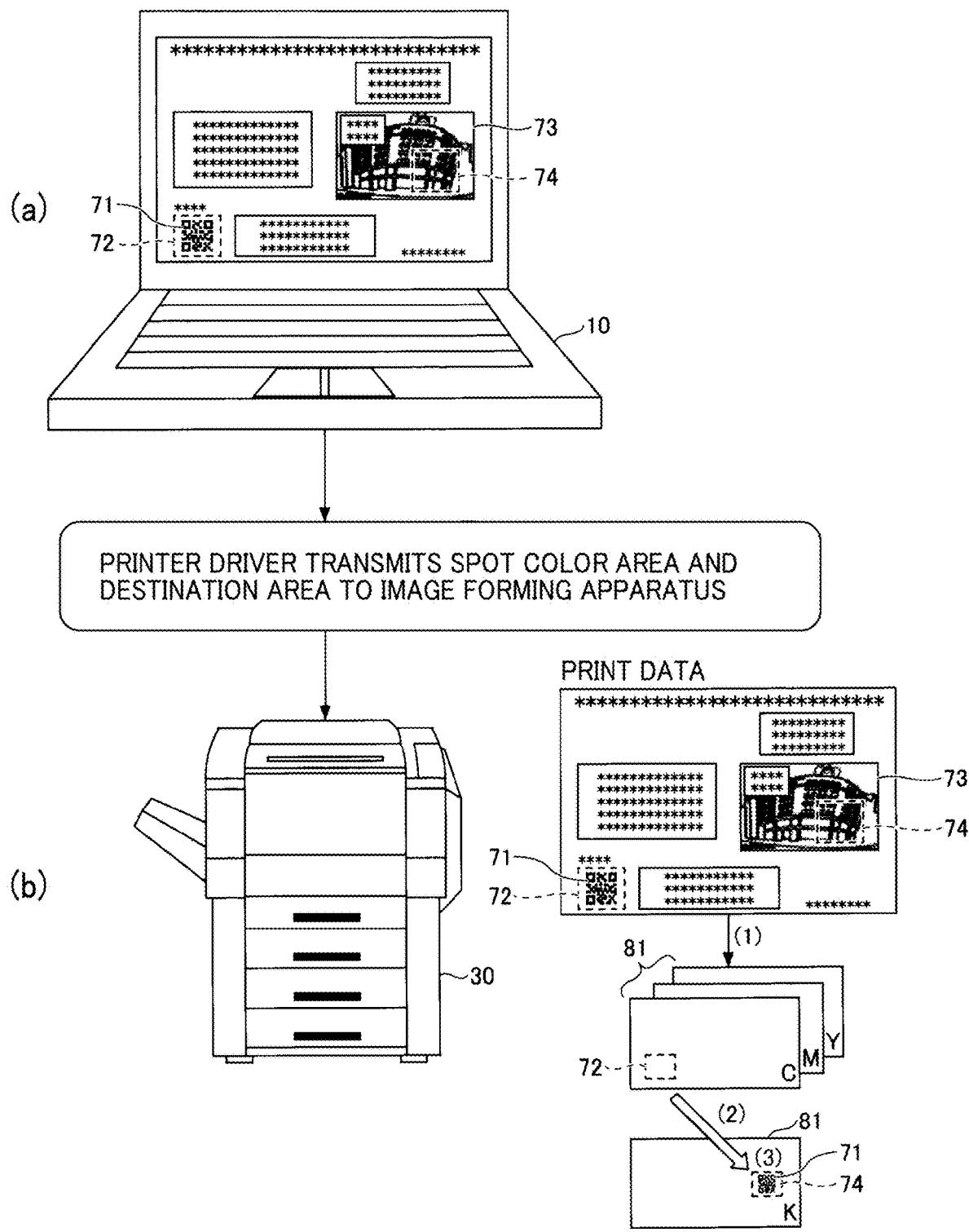
FIG. 1 is an example of a diagram illustrating a schematic operation of a printing system.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of an embodiment of the present disclosure, a printing system and a printing method performed by the printing system will be described with reference to the diagrams.

Schematic Operation of Printing System

Figure 2A:
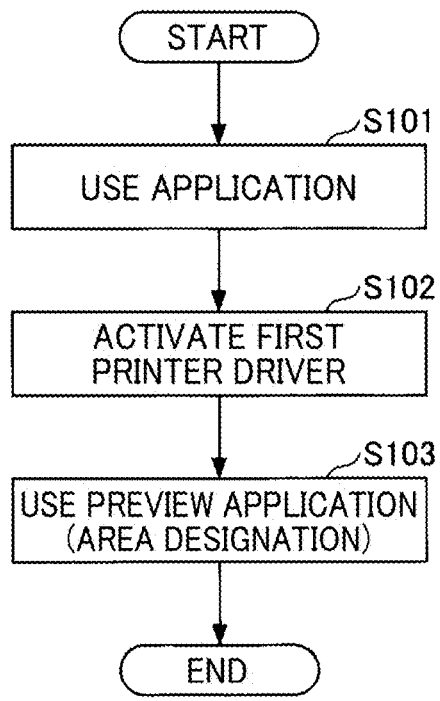
FIGS. 2A and 2B are examples of flowcharts illustrating a schematic operation of an information processing apparatus on which application software operates.
Figure 2B:
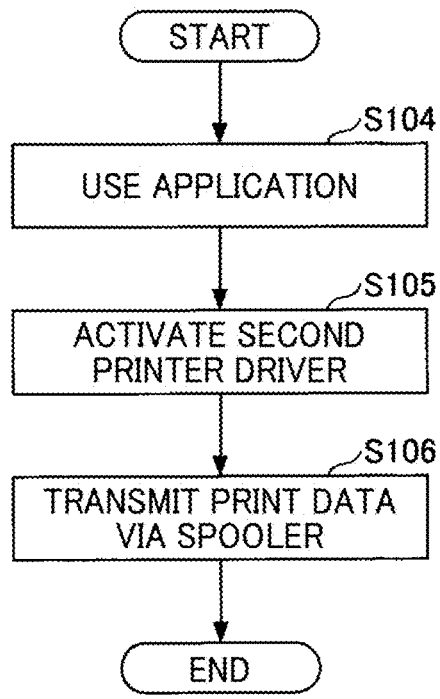

First, an outline of a method for forming an image in a spot color by an image forming apparatus will be described with reference to FIGS. 1 to 2B. FIG. 1 is an example of a diagram illustrating a schematic operation of a printing system. FIGS. 2A and 2B are examples of flowcharts illustrating a schematic operation of an information processing apparatus on which application software operates.

As illustrated in FIG. 1, processing of the printing system is divided into processing on the side of an information processing apparatus 10 (part (a) of FIG. 1) and processing on the side of an image forming apparatus 30 (part (b) of FIG. 1). Part (a) of FIG. 1 is a diagram illustrating an operation performed by a user on the information processing apparatus 10. The user executes general application software on the information processing apparatus 10, and creates a document including an object to be printed in a spot color different from C, M, Y, and K. The general application software is application software that cannot designate a spot color, in other words, application software that can handle only RGB.

(S101) The user describes an object 71 to be printed in a spot color in a document. In part (a) of FIG. 1, the object 71 is an image code (bar code or two-dimensional code), but those that can be expressed in two dimensions, such as a character, a number, a symbol, an alphabet, a figure, and a photograph, can be the object 71. The document in part (a) of FIG. 1 may be completed in advance. An image of the area selected by the user is the object 71, and the user can select the object 71 from any location in the document.

(S102) The user calls a first printer driver, which will be described later, from the application software. The first printer driver is a virtual printer driver for calling a preview application described later, and does not perform printing. The first printer driver calls a preview application.

(S103) The user sets a spot color area 72 (an example of a first area) on a preview screen, which is displayed by the preview application, so as to include the object 71 to be printed in a spot color. In part (a) of FIG. 1, a rectangular region surrounding the image code is the spot color area 72. As described above, the spot color area 72 is a region in which the object 71 to be printed in a spot color is designated.

The user can print the object 71 of the spot color area 72 in the spot color area 72, but can move the object 71 of the spot color area 72 to any location in the document and print the object 71. That is, the user can designate the destination of the object 71 of the spot color area 72. In part (a) of FIG. 1, a destination area (an example of a second area) 74 is designated in a part of a photograph 73 of the document (in practice, this is an operation on the preview screen).

When performing an operation with the information processing apparatus 10, simply designating the destination area 74 by the user does not move the image code to the destination area 74 within the document on the preview screen. When the image code moves within the document on the preview screen, for example, in part (a) of FIG. 1, an RGB value is determined in a state in which the photograph 73 and the object 71 (image code) overlap each other. Therefore, it is difficult for the image forming apparatus 30 to extract only the image code from the document overlapping the photograph 73. In the present embodiment, a transparent toner is assumed as a spot color material as will be described later, but it is difficult to print only the image code with the transparent toner. As another reason, even if only the image code can be extracted from the document overlapping the photograph, the RGB value is determined in a state in which the photograph and the image code overlap each other. Therefore, information of the original photograph is lost. In this case, if the image code is printed with transparent toner, the RGB value of a portion where the image code overlaps changes from the value of the original photograph. As a result, the image quality is lowered.

Therefore, a printing system 100 of the present embodiment can print the object 71 in a spot color at an arbitrary location without lowering the image quality because the destination area 74 can be designated. Even if the spot color material is a transparent toner, the material may be noticeable when printed on a plain portion of the paper. Therefore, since the object 71 can be printed so as to overlap a non-plain portion, the object 71 printed in a spot color can be made not to be noticeable.

(S104) Returning to the original application software, the user calls the second printer driver from the application software.

(S105, S106) The second printer driver converts the information regarding the spot color area 72 and the destination area 74 set in step S103 into print data described in printer description language (PDL), and transmits the print data to the image forming apparatus 30. As a matter of course, the second printer driver converts the document into print data, in the same manner as in the related art, in a state in which the object 71 is placed in the spot color area 72. These pieces of print data are transmitted to the image forming apparatus 30 through a spooler.

Next, the processing on the image forming apparatus 30 side will be described. Part (b) of FIG. 1 is a diagram illustrating a process performed by the image forming apparatus 30. The image forming apparatus 30 is a general image forming apparatus 30 in which a spot color cannot be designated (only C, M, Y, and K can be designated). The image forming apparatus 30 of the present embodiment is a color printer that performs printing in a combination of four colors of cyan, magenta, yellow, and black (C, M, Y, and K). The image forming apparatus 30 converts RGB print data output from the printer driver into C, M, and Y print data. That is, conversion into K is not performed. Black can also be expressed only by C, M, and Y among C, M, Y, and K. The reason why a general image forming apparatus also uses K is to improve color developability and reduce the amount of toner used. In the image forming apparatus 30 of the present embodiment, a spot color is assigned to K by using the fact that black can be printed without K (a spot color material is stored in a K toner cartridge).

(1) As illustrated in part (b) of FIG. 1, the image forming apparatus 30 creates C, M, and Y plane images 81 in which the presence or absence of coloring is expressed by dots (bits) (image data in which a pixel is expressed as 1 or 0) based on the print data transmitted from the information processing apparatus 10.

(2) Since the object 71 of the spot color area 72 is drawn on each of the C, M, and Y plane images 81, the image forming apparatus 30 extracts image data of the spot color area 72 from each of the C, M, and Y plane images 81. That is, an image of the object 71 is extracted. The image data of the spot color area 72 is deleted.

(3) The image forming apparatus 30 converts the C, M, and Y image data of the spot color area 72 into the K plane image 81. This is because K is assigned as a spot color in the image forming apparatus 30, and conversion into a color that is not present (color that is not assigned) in the image forming apparatus 30 may be performed. The image forming apparatus 30 places the object 71 converted into K in the destination area 74 of the K plane image.

The image forming apparatus 30 forms the C plane image 81 with C toner, the M plane image 81 with M toner, the Y plane image 81 with Y toner, and the K plane image 81 with a spot color material, so that it is possible to obtain an output product in which the object 71 of the spot color area 72 is printed in the destination area 74 using the spot color material.

Thus, in the printing system 100 of the present embodiment, printing using a spot color can be implemented without the image forming apparatus 30 capable of designating a spot color or application software capable of designating the spot color or both.

If there is the image forming apparatus 30 capable of designating a spot color and application software capable of designating a spot color, printing using the spot color is possible, but a complicated operation is required as described below. a. Document data created by general application software is output (PDF output) as image data. b. The image data (PDF) is read by application software capable of designating a spot color. c. A user performs an operation of adding a spot color plane (creates a PDF file including an RGB image and a spot color plane).

On the other hand, in the present embodiment, printing using a spot color can be implemented by a user's operation of calling a printer driver on a general application and designating the spot color area 72 and the destination area 74.

Terms

The spot color refers to a primary color other than C, M, Y, and K (referred to as process colors). For example, the spot color is gold, silver, white, or transparent. Since some (in particular, inkjet type) image forming apparatuses can use inks of different colors in addition to C, M, Y, and K, the spot color may differ between image forming apparatuses. The spot color can be said to be a color that cannot be expressed in RGB by the application software. A color material such as toner or ink with which a spot color can be printed is called a spot color material.

"Transparent" means invisible for light having a certain wavelength. It is not required that the image is completely invisible, and it is sufficient that the image is invisible at first glance and/or that the imaging apparatus cannot capture an image. The transparent toner or ink may be referred to as stealth toner or stealth ink.

In the present embodiment, for example, an image forming apparatus in which a spot color is assigned to K is used instead of an image forming apparatus capable of designating and printing a spot color other than C, M, Y, and K. That is, only C, M, Y, and K colors can be handled. The image forming apparatus 30 of the present embodiment does not use K toner, and a spot color material is stored in the K toner cartridge. However, an image forming apparatus (C, M, Y, K+spot color) capable of designating and printing a spot color can also be used.

An object is a part of a printed document or the entire printed document. The object may be clearly distinguished from other objects, or may be connected to other objects.

A predetermined color refers to a primary color other than the spot color.

System Configuration Example

Figure 3:
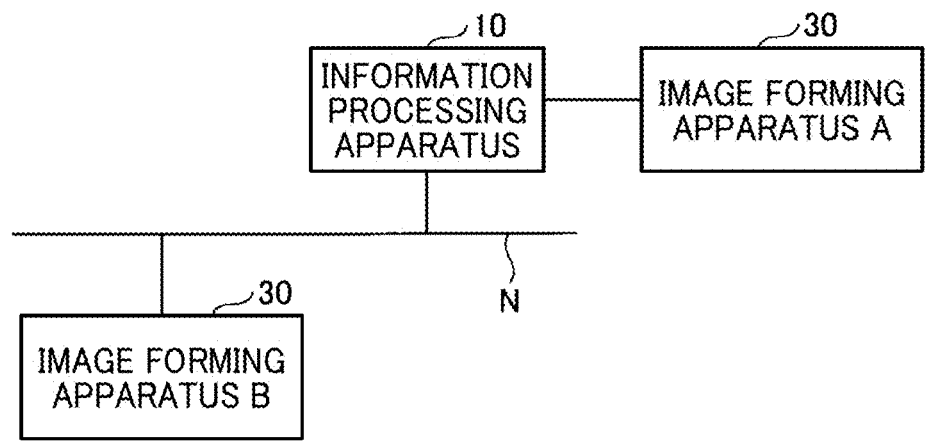
FIG. 3 is an example of a schematic configuration diagram of the printing system.

FIG. 3 is an example of a schematic configuration diagram of the printing system 100. The printing system 100 illustrated in FIG. 3 includes the information processing apparatus 10 and one or more image forming apparatuses 30. The image forming apparatus 30 connected to the information processing apparatus 10 by a dedicated line is referred to as an image forming apparatus 30A, and the image forming apparatus 30 connected to the network is referred to as an image forming apparatus 30B. An arbitrary image forming apparatus 30 among the plurality of image forming apparatuses 30A and 30B is referred to as the "image forming apparatus 30".

The information processing apparatus 10 and the image forming apparatus 30A are connected to each other in Peer To Peer (in a one-to-one manner) by a dedicated line, such as a universal serial bus (USB) cable. However, since the information processing apparatus 10 and the image forming apparatus 30A are not required to be connected to each other all the time, the user can attach and detach the dedicated line. In addition to the USB cable, for example, a personal computer (PC) card, peripheral component interconnect (PCI), institute of electrical and electronics engineers 1394 (IEEE 1394), and small computer system interface (SCSI) can be used.

The information processing apparatus 10 and the image forming apparatus 30A may be wirelessly connected to each other so as to be able to communicate with each other. Examples of wireless communication for peer-to-peer connection include Bluetooth (registered trademark) and wireless local area network (LAN).

The information processing apparatus 10 is communicably connected to the image forming apparatus 30B through a network. The network N is assumed to be a general network, such as a LAN or the Internet. The LAN is, for example, a LAN in a facility such as a company where the image forming apparatus 30B is placed. In addition, the network N may include a virtual private network (VPN) or a wide area Ethernet (registered trademark). The network N may be constructed either by wire or wirelessly, or may be a combination of wired and wireless.

The information processing apparatus 10 executes various control programs, such as an operating system (OS) and a printer driver, and application software to provide a function corresponding to the application software. The information processing apparatus 10 is often called a computer. The control program is, for example, a program called a device driver (software prepared so that hardware or the like connected to a personal computer can be controlled by the OS), and a printer driver is an example of the device driver. Specific examples of the information processing apparatus 10 include a personal computer (PC), a smartphone, a tablet terminal, a personal digital assistant (PDA), and a wearable PC.

Besides, the information processing apparatus 10 may be an apparatus on which an OS, a control program, and application software operate, such as a smart board (white board: an apparatus having an electronic blackboard function that enables bidirectional communication), an output device such as a digital signage, a projector, and a video conference terminal.

The image forming apparatus 30 forms an image, such as a character or a figure, on a recording medium mainly with toner or ink. In the present embodiment, C, M, and Y image data can be formed as an image using a toner or ink that can be read by the naked eye (hereinafter, referred to as a visible material), and K image data can be formed as an image using a spot color material (toner or ink). The image forming apparatus 30 can form an image on one recording medium using both a visible material and a spot color material. It is also possible to form an image with only one of the visible material and the spot color material.

As a spot color material, it is possible to use a toner or ink that has absorptivity in the wavelength region (around 850 nm) of infrared light including near-infrared light and a toner or ink with low absorptivity in the wavelength region of visible light (about 400 to 700 nm) (absorptivity in the wavelength region of visible light is lower than that in the wavelength region of infrared light). Such a spot color material is transparent (invisible) for visible light, and is readable when infrared light is emitted. Therefore, the spot color means being transparent for visible light. The spot color material looks black because the spot color material absorbs infrared light when the infrared light is emitted. The colors C, M, and Y are transparent for infrared light. On the other hand, some K color materials (normal black toner) do not absorb infrared light. If a K color material that absorbs infrared light is formed together with a spot color material, both appear black. This makes it difficult to recognize the object 71 formed of the spot color material. Therefore, the K color material that absorbs infrared light and the spot color material cannot be formed on the same paper. On the other hand, even if a K color material that does not absorb infrared light is formed together with a spot color material, only the spot color material appears black when infrared light is emitted. As a result, the object 71 formed of the spot color material can be recognized. In the present embodiment, the image forming apparatus 30 that performs printing without using the color of K will be described. For this reason, black is expressed by forming C, M, and Y in an overlapping manner. However, there is no problem even if printing is performed using five colors of C, M, Y, K+spot color including the K color material that does not absorb infrared light.

Since the spot color material can form information by which the authenticity of the output product can be determined, there is an effect of suppressing duplication of the output product. Therefore, since the security is improved, the spot color material can be regarded as a security consumable.

The spot color material may be a toner or ink that has absorptivity for ultraviolet light (UV) and low absorptivity for visible light. An image may be formed by using a material that is transparent in a normal state but can be visualized by causing a chemical change by heat, laser, chemicals, or the like. Alternatively, information that is difficult to check with the naked eye may be formed by forming irregularities.

Any recording medium on which the image forming apparatus 30 performs printing may be used as long as a toner or ink can be attached to the medium. This is a recording medium to which a toner or ink can adhere, and means a recording medium to which a toner or ink adheres to be fixed, a recording medium to which a toner or ink adheres to permeate through the medium, and the like. Specific examples of the recording medium include paper, recording paper, film, and cloth, electronic components such as an electronic board and a piezoelectric element, and media such as a powder layer, and include anything to which a toner or ink adheres unless otherwise specified in particular.

Materials to which "toner or ink can adhere" may be paper, thread, fiber, cloth, leather, metal, plastic, glass, wood, ceramics, and the like as long as a toner or ink can adhere even temporarily.

The image forming apparatus 30 includes, in addition to a printing apparatus using an electrophotography technique, a printing apparatus using an inkjet technique for discharging droplets and a printing apparatus for thermally transferring an ink ribbon. The image forming apparatus 30 may be a multifunction peripheral. The term "multifunction" of the multifunction peripheral means having an image forming function and a plurality of functions, such as facsimile transmission and reception, document scan, and copy. The multifunction peripheral may be called a multifunction peripheral/printer/product (MFP). However, in the present embodiment, it is sufficient to have an image forming function. The image forming apparatus 30 may be called a printer.

Example of Hardware Configuration

Hereinafter, the hardware configuration of the information processing apparatus 10 and the image forming apparatus 30 included in the printing system 100 will be described.

Information Processing Apparatus

Figure 4:
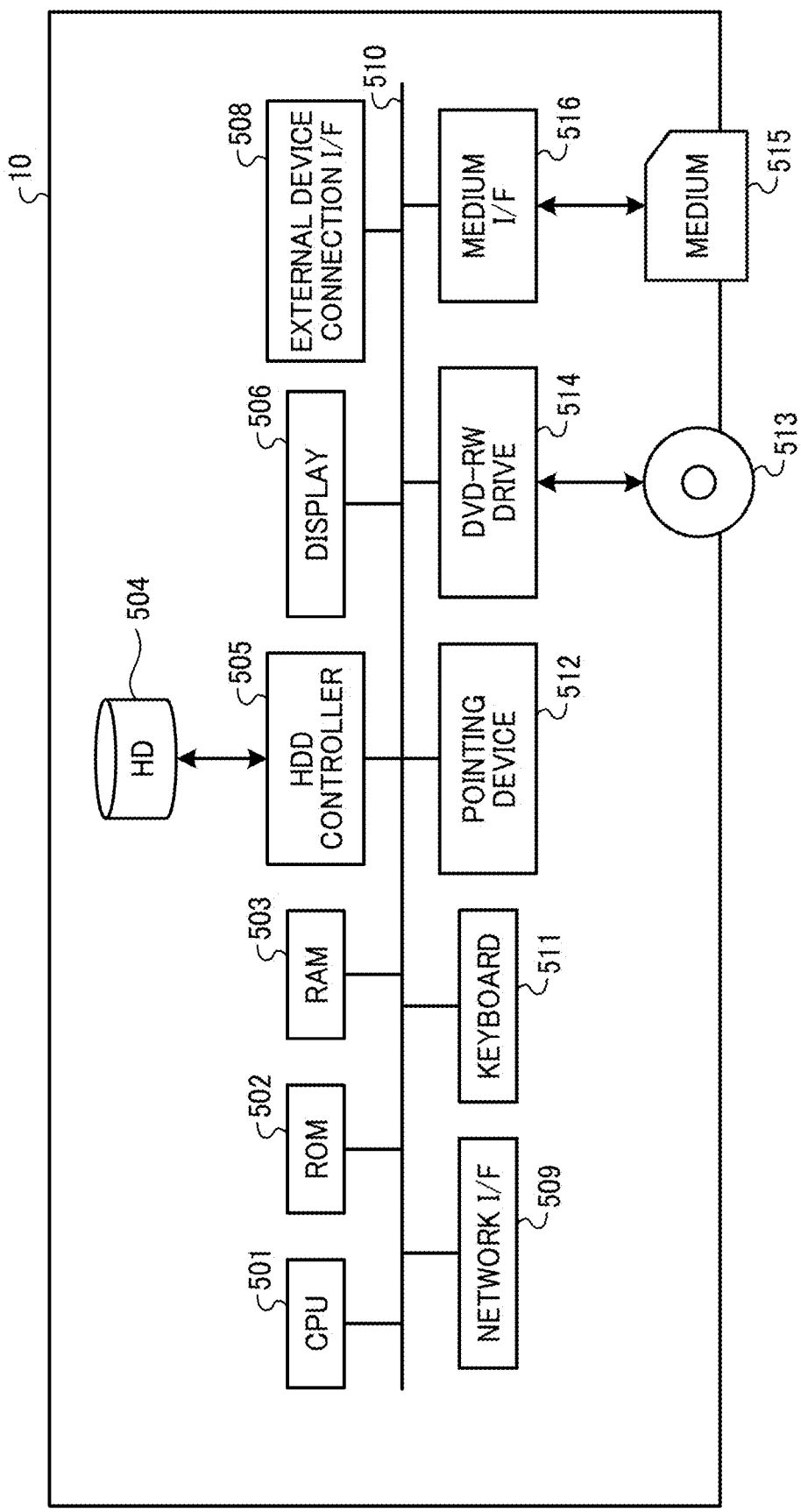
FIG. 4 is an example of a hardware configuration diagram of an information processing apparatus.

FIG. 4 is a hardware configuration diagram of the information processing apparatus 10. As illustrated in FIG. 4, the information processing apparatus 10 is constructed by a computer. As illustrated in FIG. 4, the information processing apparatus 10 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

Among these, the CPU 501 controls the operation of the entire information processing apparatus 10. The ROM 502 stores a program used for driving the CPU 501, such as an initial program loader (IPL). The RAM 503 is used as a work area of the CPU 501. The HD 504 stores various kinds of data, such as a program. The HDD controller 505 controls reading or writing of various kinds of data from or to the HD 504 under the control of the CPU 501. The display 506 displays various kinds of information, such as a cursor, a menu, a window, characters, or an image. The external device connection I/F 508 is an interface for connecting various external devices. In this case, the external device is, for example, a universal serial bus (USB) memory or a printer. The network I/F 509 is an interface for performing data communication using the network N. The data bus 510 is an address bus, a data bus, or the like for electrically connecting components such as the CPU 501 illustrated in FIG. 4.

The keyboard 511 is a type of input device having a plurality of keys for inputting characters, numerical values, various instructions, and the like. The pointing device 512 is a type of input device for selecting or executing various instructions, selecting a processing target, moving a cursor, and the like. The DVD-RW drive 514 controls reading or writing of various kinds of data from or to the DVD-RW 513 as an example of a removable recording medium. Without being limited to the DVD-RW, a DVD-R and the like may be used. The media I/F 516 controls reading or writing (storage) of data from or to a recording medium 515, such as a flash memory.

Image Forming Apparatus

Figure 5:
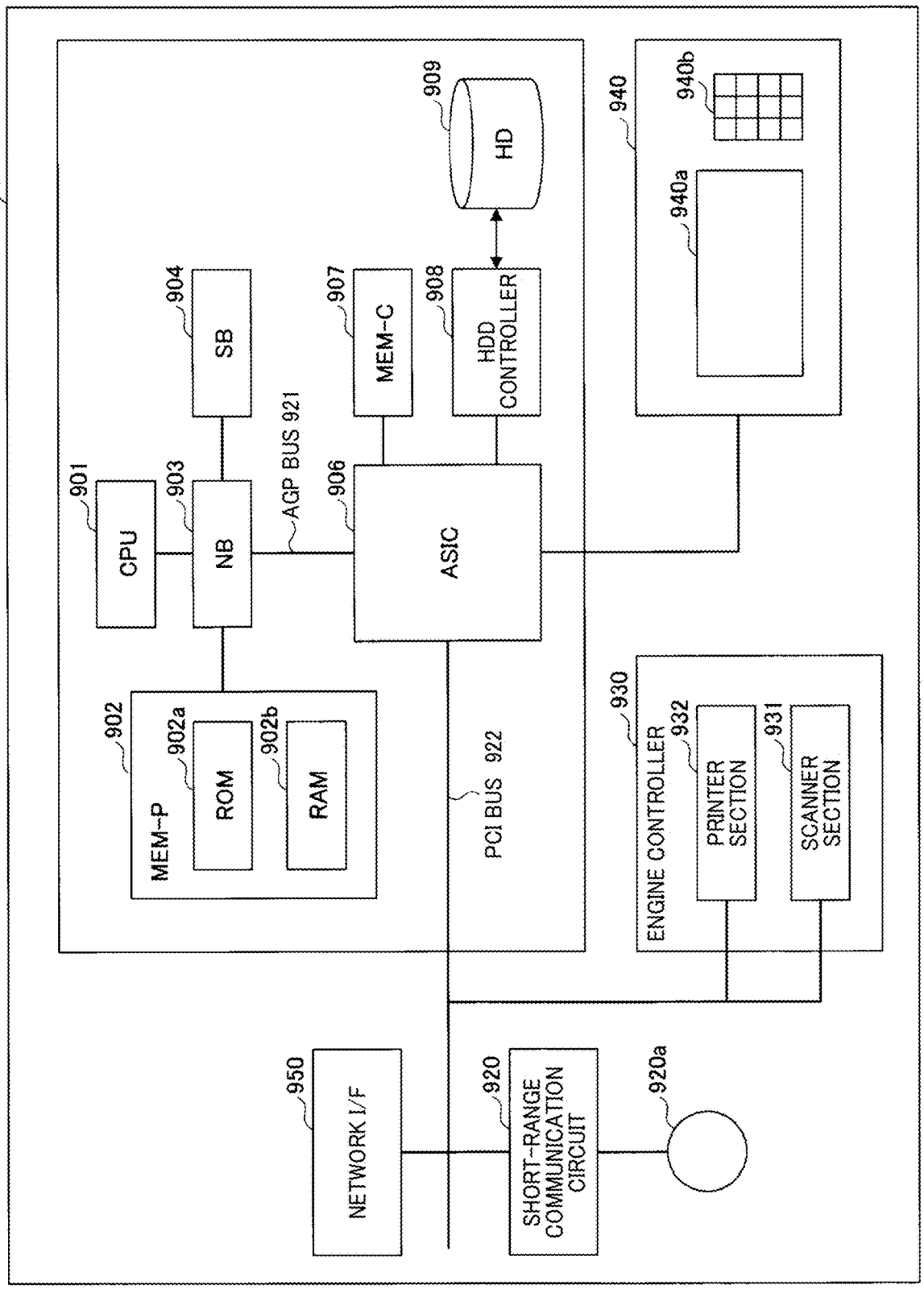
FIG. 5 is an example of a hardware configuration diagram of an image forming apparatus.

FIG. 5 is a hardware configuration diagram of the image forming apparatus 30. As illustrated in FIG. 5, the image forming apparatus 30 includes a controller 910, a short-range communication circuit 920, an engine controller 930, an operation panel 940, and a network I/F 950.

Among these, the controller 910 includes a CPU 901 that is a main part of a computer, a system memory (MEM-P) 902, a north bridge (NB) 903, a south bridge (SB) 904, an application specific integrated circuit (ASIC) 906, a local memory (MEM-C) 907 that is a memory, an HDD controller 908, and an HD 909 that is a memory, and the NB 903 and the ASIC 906 are connected to each other by an accelerated graphics port (AGP) bus 921.

Among these, the CPU 901 is a controller that performs an overall control of the image forming apparatus 30. The NB 903 is a bridge for connecting the CPU 901 with the MEM-P 902, the SB 904, and the AGP bus 921, and includes a memory controller for controlling reading, writing, and the like of the MEM-P 902, a peripheral component interconnect (PCI) master, and an AGP target.

The MEM-P 902 includes a ROM 902a that is a memory for storing a program or data for implementing the functions of the controller 910 and a RAM 902b that is used as a drawing memory at the time of loading a program or data and at the time of memory printing. The program stored in the RAM 902b may be provided by being recorded in a computer-readable recording medium, such as a CD-ROM, a CD-R, or a DVD, in an installable format or an executable format file.

The SB 904 is a bridge for connecting the NB 903 with a PCI device and a peripheral device. The ASIC 906 is an integrated circuit (IC) for image processing having hardware elements for image processing, and has a role of a bridge that connects the AGP bus 921, a PCI bus 922, the HDD controller 908, and the MEM-C 907. The ASIC 906 includes a PCI target and an AGP master, an arbiter (ARB) that forms the core of the ASIC 906, a memory controller that controls the MEM-C 907, a plurality of direct memory access controllers (DMACs) that performs rotation or the like of image data using hardware logic or the like, and a PCI unit for transferring data between a scanner section 931 and a printer section 932 through the PCI bus 922. A universal serial bus (USB) interface or an institute of electrical and electronics engineers 1394 (IEEE 1394) interface may be connected to the ASIC 906.

The MEM-C 907 is a local memory used as a copy image buffer and a code buffer. The HD 909 is a storage for storing image data, storing font data used at the time of printing, and storing a form. The HD 909 controls reading or writing of data from or to the HD 909 under the control of the CPU 901. The AGP bus 921 is a bus interface for a graphics accelerator card that has been proposed to speed up graphic processing. By directly accessing the MEM-P 902 with high throughput, the graphics accelerator card can be operated at high speed.

The short-range communication circuit 920 includes a short-range communication antenna 920a. The short-range communication circuit 920 is a communication circuit, such as near field communication (NFC) or Bluetooth.

The engine controller 930 includes the scanner section 931 and the printer section 932. The operation panel 940 includes a panel display 940a such as a touch panel that displays current setting values, a selection screen, and the like and receives an input from an operator and a hard key 940b including ten keys for receiving setting values of conditions relevant to image formation, such as density setting conditions, and a start key for receiving a copy start instruction. The controller 910 performs overall control of the image forming apparatus 30. For example, the controller 910 control drawing, communication, input from the operation panel 940, and the like. The scanner section 931 or the printer section 932 includes an image processing unit for error diffusion, gamma conversion, and the like.

The image forming apparatus 30 can sequentially switch and select a document box function, a copy function, a printer function, and a facsimile function by using an application switching key on the operation panel 940. A document box mode is set when the document box function is selected, a copy mode is set when the copy function is selected, a printer mode is set when the printer function is selected, and a facsimile mode is set when the facsimile mode is selected.

The network I/F 950 is an interface for performing data communication using the network N. The short-range communication circuit 920 and the network I/F 950 are electrically connected to the ASIC 906 through the PCI bus 922.

Functions of information processing apparatus and image forming apparatus

Next, the functions of the information processing apparatus 10 and the image forming apparatus 30 will be described with reference to FIGS. 6 and 7.

Information Processing Apparatus

Figure 6:
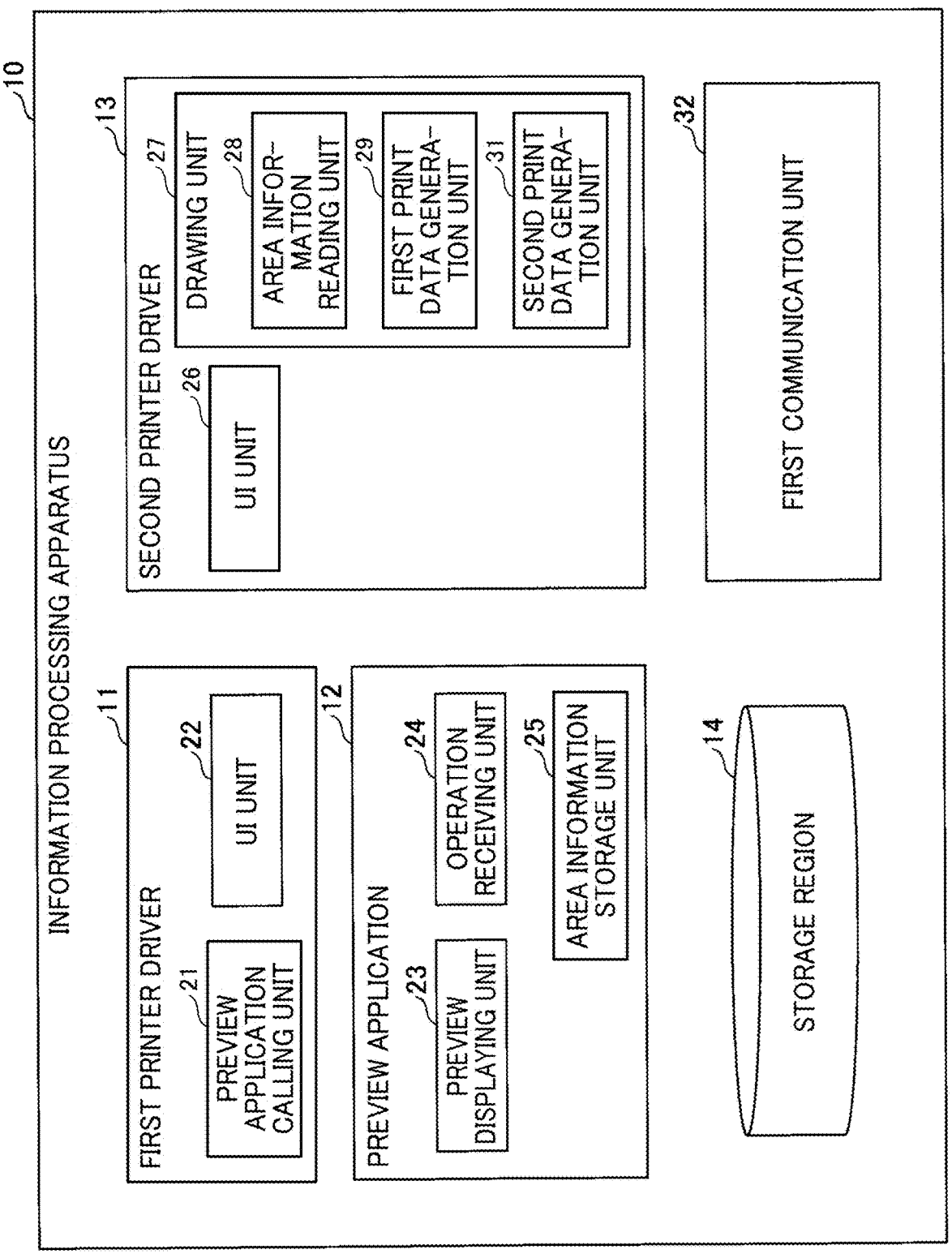
FIG. 6 is an example of a functional block diagram illustrating functions of the information processing apparatus in a block shape.

FIG. 6 is an example of a functional block diagram illustrating the functions of the information processing apparatus 10 in a block shape. In the information processing apparatus 10, three programs of a first printer driver 11, a preview application 12, and a second printer driver 13 operate. Application software for calling the first printer driver 11 or the second printer driver 13 is omitted.

Any application software capable of calling the printer driver may be used. For example, there are word processing software, presentation software, spreadsheet software, PDF software, and browser software. These application software save and read files in the corresponding formats. A document file in which the object 71 is printed in a spot color is also created in a format corresponding to the application software used by the user.

In FIG. 6, programs of the information processing apparatus 10 are divided into three programs. However, the first printer driver 11 may have the function of the preview application 12. The first printer driver 11 and the second printer driver 13 may be unified into one printer driver. In this case, the user can designate an operation mode in the print settings. Therefore, the first printer driver 11, the preview application 12, and the second printer driver 13 may be one program.

When printing a document, the user can call the first printer driver 11 to automatically activate the preview application 12, and the user can designate the spot color area 72 and the destination area 74 in the preview application 12. Therefore, in addition to the known operation of printing a document on application software, an operation of designating the spot color area 72 and the destination area 74 may be additionally performed. For this reason, the operability is not easily reduced.

First Printer Driver

The first printer driver 11 has a preview application calling unit 21 and a user interface (UI) unit 22. Each of the functions of the first printer driver 11 is a function or means implemented when one of the components illustrated in FIG. 4 operates according to a command from the CPU 501 according to the first printer driver 11 loaded to the RAM 503 from the HD 504.

The first printer driver 11 is recognized as a printer driver by the OS. Accordingly, when the user calls the first printer driver 11, the first printer driver 11 is activated on application software. However, the first printer driver 11 does not have a function of printer driver.

That is, although the printer driver usually has a UI unit and a drawing unit, the first printer driver 11 may not have the functions of the UI unit and the drawing unit. The illustrated UI unit 22 is described because a printer driver without the UI unit 22 cannot be created. However, the first printer driver 11 may have the function of the UI unit 22 that actually operates. For example, an extensible markup language (XML) paper specification (XPS) driver attached to the OS is used as the drawing unit. An electronic document created by the XPS driver is used for displaying the preview. The XPS is an XML-based electronic document. The XPS is a document format in which an information processing apparatus can display a file created by any application software. In addition to the XPS, a portable document format (PDF) may be used.

The preview application calling unit 21 activates the preview application 12. That is, when the user calls the first printer driver 11 and the first printer driver 11 completes the activation, the preview application calling unit 21 automatically activates the preview application 12 without the user performing the next operation. The identification information of the preview application 12 on the OS is set in the preview application calling unit 21, and the preview application calling unit 21 designates the identification information to send a request for activation to the OS.

Preview Application

The preview application 12 has a preview displaying unit 23, an operation receiving unit 24, and an area information storage unit 25. Each of the functions of the preview application 12 is a function or means implemented when one of the components illustrated in FIG. 4 operates according to a command from the CPU 501 according to the preview application 12 loaded to the RAM 503 from the HD 504.

The preview displaying unit 23 reads an electronic document created by the XPS driver, and displays a print image (preview screen) of the document to be printed that is displayed on the display 506 by the application software that has called the first printer driver 11.

The operation receiving unit 24 receives a user's operation on the preview screen. The user's operation is to designate a range or input coordinates using a pointing device, such as a mouse or a touch panel, to designate the spot color area 72 and the destination area 74. When the user enlarges or reduces the destination area 74, the size of the enlarged or reduced destination area 74 is received. The rotation angle of the destination area 74 may be received.

The area information storage unit 25 stores the spot color area 72 and the destination area 74 (hereinafter, referred to as area information) designated by the user in a storage region 14. The area information is location information or coordinate information of the spot color area 72 and the destination area 74. The storage region 14 is a region, such as the HD 504 or the registry of the information processing apparatus 10. In addition to the information processing apparatus 10, any location where data can be stored, such as a network folder or a region on a cloud, may be used. The area information storage unit 25 stores area information in a predetermined URL of the storage region 14 (that is, a storage destination is determined in advance). Alternatively, area information is stored under a predetermined file name in a predetermined folder name (or directory name) of the storage region 14. Therefore, the second printer driver 13 can read the area information.

Second Printer Driver

The second printer driver 13 has a UI unit 26 and a drawing unit 27. Each of the functions of the second printer driver 13 is a function or means implemented when one of the components illustrated in FIG. 4 operates according to a command from the CPU 501 according to the second printer driver 13 loaded to the RAM 503 from the HD 504.

The UI unit 26 displays an item for receiving a selection as to whether or not to enable "spot color area read and print" on a print setting screen described later. In addition, general print setting items, such as the number of copies to be printed, double-sided, and combined, are displayed, and the settings are received.

The drawing unit 27 further includes an area information reading unit 28, a first print data generation unit 29, and a second print data generation unit 31.

The area information reading unit 28 reads the area information stored in the area information storage unit 25 of the preview application 12 from the storage region 14. However, when the UI unit 26 receives a setting for disabling "spot color area read and print", the area information is not required. Therefore, the area information reading unit 28 does not read the area information.

The first print data generation unit 29 converts the read area information into print data (an example of first print data) described in PDL interpreted by the image forming apparatus 30. The print data is a list of commands executed by the image forming apparatus 30. When the UI unit 26 receives a setting for disabling "spot color area read and print", the area information is not converted into print data. The area information converted into print data may be referred to as an "area information command" for convenience.

The second print data generation unit 31 generates print data (an example of second print data) described in PDL interpreted by the image forming apparatus 30 by reflecting print settings in a document displayed by the information processing apparatus 10. Regardless of [Enable]/[Disable] of "Spot color area read and print", print data is generated.

The information processing apparatus 10 has a first communication unit 32. The first communication unit 32 connects to the network N to transmit print data or receive the status or the like of the image forming apparatus 30 through the network N.

Image Forming Apparatus

Figure 7:
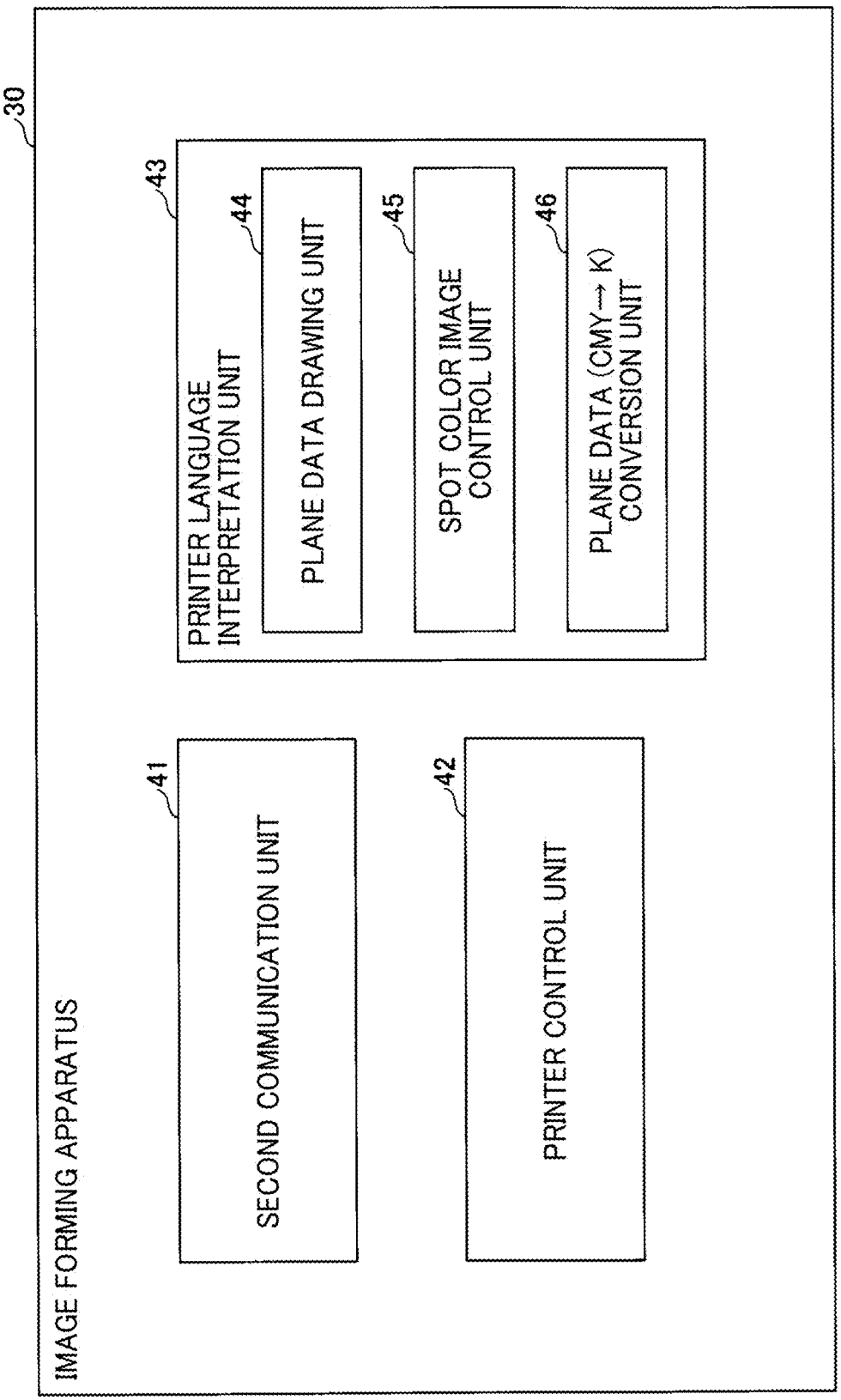
FIG. 7 is an example of a functional block diagram illustrating functions of the image forming apparatus in a block shape.

FIG. 7 is an example of a functional block diagram illustrating the functions of the image forming apparatus 30 in a block shape. The image forming apparatus 30 includes a second communication unit 41, a printer control unit 42, and a printer language interpretation unit 43. Each of the functions of the image forming apparatus 30 is a function or means implemented when one of the components illustrated in FIG. 5 operates according to a command from the CPU 901 according to a program loaded to the RAM 902b from the HD 909.

The second communication unit 41 performs network control to connect to the network N to receive print data or transmit the status or the like of the image forming apparatus 30 through the network N.

The printer control unit 42 controls printing of print data received by the second communication unit 41 or read through a storage medium. That is, a plane image of each color of C, M, Y, and K is formed so as to be superimposed on an intermediate transfer member or paper, and is discharged to a paper ejection tray through a fixing device. The plane image is image data in which the presence or absence of a pixel is expressed by a bit (1 or 0) for each single color of C, M, Y, and K.

The printer language interpretation unit 43 interprets the print data acquired from the printer control unit 42 and converts the print data into data (plane image described above) that can be printed by the printer section 932. The printer language interpretation unit 43 includes a plane data drawing unit 44, a spot color image control unit 45, and a plane data conversion unit 46.

The plane data drawing unit 44 interprets the print data to generate image data (bitmap data or raster data) in units of pages. The plane data drawing unit 44 generates the plane image 81 that can be printed by the printer section 932, for each color of C, M, Y, and K used for printing by the image forming apparatus 30, by performing color matching processing and screening processing. The color matching processing is processing for converting the input color (or monochrome) print data at an optimal conversion ratio for printing with the toner of four colors of C, M, Y, and K of the image forming apparatus 30. However, in the present embodiment, since K is assigned as a spot color, conversion into C, M, and Y (an example of predetermined colors) is performed. The print data input from the information processing apparatus 10 may be expressed in an RGB color space, or may be expressed in a CMYK color space. However, when general application software is used, the RGB color space is adopted. The plane data drawing unit 44 converts the print data in the RGB color space into a device-independent color space by color matching processing and then converts the print data into a device color space suitable for the characteristics of the image forming apparatus 30, and the print data is converted into the CMYK color space (K is not used).

The conversion expression from RGB to CMY is as follows. Since the maximum value is 1 in this conversion, multiplication using the gradation (for example, 255) of C, M, and Y is performed: $C=1-(R/255)$, $M=1-(G/255)$, and $Y=1-(B/255)$. This conversion is merely a general one, and it is preferable to perform the conversion using a conversion expression optimal for the image forming apparatus 30.

The screening processing is processing for expressing a difference in shading using the optical illusion by changing the size or density of halftone dots in a pseudo-gradation expression method, such as a dither method, and is processing for converting bitmap data or raster data into the plane image 81 that can be printed by the printer section 932. In the plane image 81, 1 (ON: draw) or 0 (OFF: do not draw) is set for each dot corresponding to a pixel drawn as a point by laser or ink.

The spot color image control unit 45 performs processing relevant to the spot color area 72 and the destination area 74 based on the area information stored in the storage region 14. First, image data of the spot color area 72 of each of the C, M, and Y plane images 81 is extracted, and the spot color area 72 is cleared to zero. Zero clear means that the image data of the spot color area 72 is set to zero. That is, nothing is printed in the spot color area 72. An arbitrary image (such as a company logo, a mascot icon, or a company name) may be drawn after zero clear, or zero clear may not be performed.

The plane data conversion unit 46 converts the image data of the spot color area 72 extracted from the C, M, and Y plane images 81 into K image data. Since the C, M, and Y plane images 81 are expressed by 1 or 0, the conversion into K=1 is performed in the case of C, M, or Y=1, that is, C=1→K=1, M=1→K=1, and Y=1→K=1. The spot color image control unit 45 places image data of the spot color area 72, which is obtained by conversion from C, M, and Y to K, in the destination area 74 of the K plane image 81. Therefore, the K plane image 81 becomes the plane image 81 in which the object 71 is placed only in the destination area 74.

Operation Procedure

Figure 8:
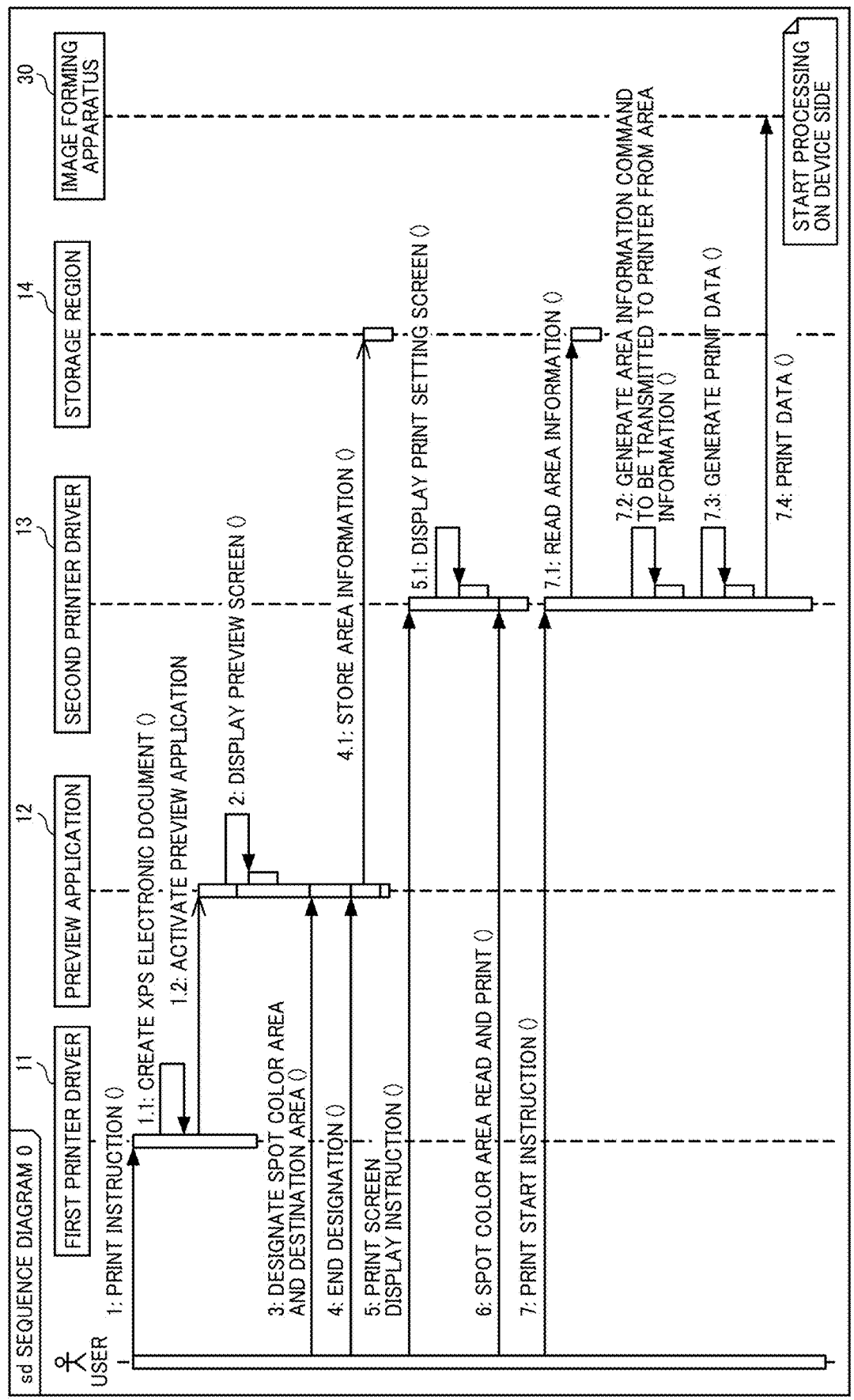
FIG. 8 is an example of a flowchart illustrating a procedure in which the information processing apparatus generates print data.

Next, the procedure of a process on the information processing apparatus 10 side will be described with reference to FIG. 8. FIG. 8 is an example of a flowchart illustrating a procedure in which the information processing apparatus 10 generates print data. Screen examples illustrated in FIGS. 9 to 13 are appropriately referred to.

Figure 9:
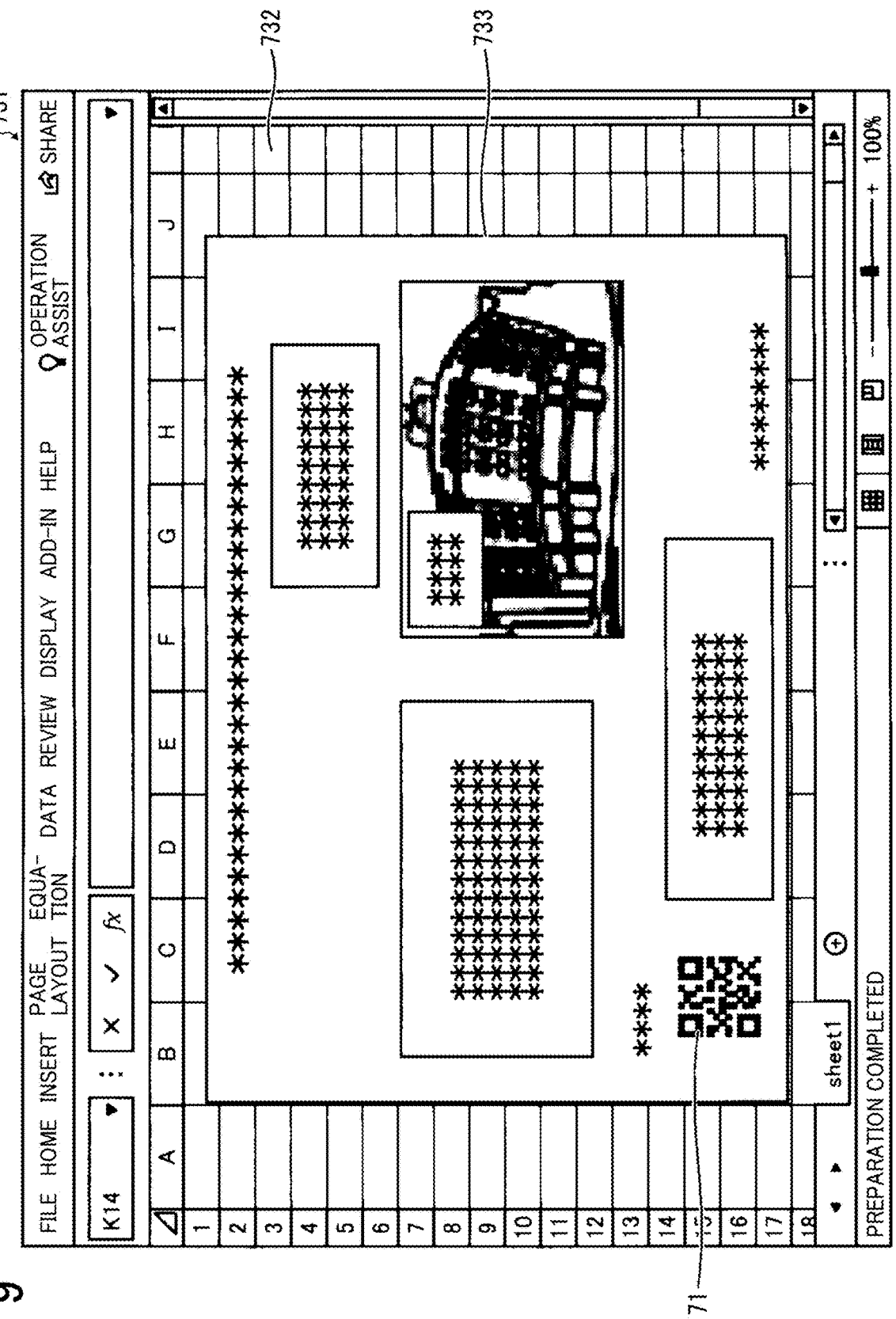
FIG. 9 is an example of a document screen on which a document created by application software is displayed.

A user has already created a document, which includes the object 71 to be printed in a spot color, on the application software (refer to FIG. 9).

S1: First, the user starts printing a document from the state of the screen in FIG. 9. Specifically, an operation of calling a print screen 701 is performed. The application software receives this operation and displays the print screen 701 on the display 506 (refer to FIG. 10). The user selects the first printer driver 11 on the print screen 701 and presses a print button 702. The first printer driver 11 receives the pressing of the print button 702. As described above, the first printer driver 11 is a printer driver that does not transmit print data to the image forming apparatus 30 (there is no corresponding image forming apparatus 30).

S1.1: When the first printer driver 11 is activated, the XPS driver generates an XPS electronic document for preview display. More simply, data for a preview screen may be generated by capturing a screen of application software, for example.

S1.2: Then, the preview application calling unit 21 activates the preview application 12. The user is not required to perform a call operation of the preview application 12, and may not be aware of activation of another application. However, the preview application 12 may be activated by a user's explicit operation.

Figure 11:
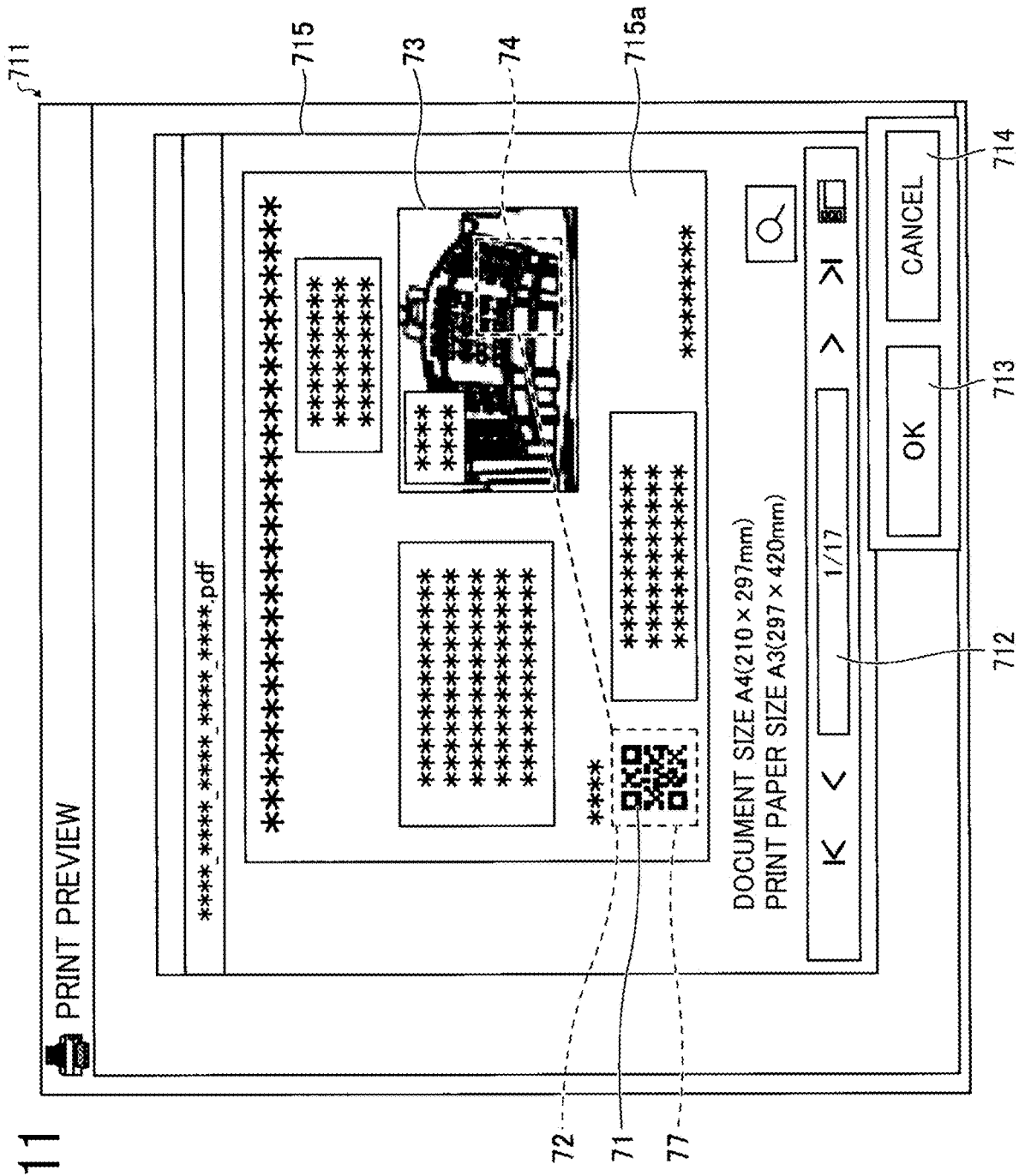
FIG. 11 is an example of a preview screen displayed on a display by a preview application.

S2: When the preview application 12 is activated, the preview displaying unit 23 interprets the XPS electronic document and displays a preview screen on the display 506. FIG. 11 illustrates an example of a preview screen 711.

S3: The user operates a pointing device to designate the spot color area 72 and the destination area 74 on the preview screen 711. The operation receiving unit 24 receives the designation of the spot color area 72 and the destination area 74. If the object 71 to be printed is not required to move in a spot color, the destination area 74 may not be set.

S4: When the designation of the spot color area 72 and the destination area 74 is completed, the user ends the display of the preview screen 711. For example, an OK button 713 is pressed on the preview screen. The operation receiving unit 24 receives the pressing of the OK button 713.

S4.1: By the pressing of the OK button 713, the area information storage unit 25 stores the area information in the storage region 14. Due to the pressing of the OK button 713, the preview application 12 requests the OS to end the software, so that the preview application 12 ends. Therefore, the state returns to the state illustrated in FIG. 9.

S5: Then, the user starts printing the document from the state of the screen in FIG. 9. As in step S1, an operation for calling the print screen 701 is performed. The application software receives this operation and displays the print screen 701 on the display 506 (refer to FIG. 12A).

S5.1: The user selects the second printer driver 13 on the print screen 701, and presses a button (for example, a property button 705) for displaying a print setting screen 721. The second printer driver 13 is a printer driver corresponding to the image forming apparatus 30 that can print a spot color as, for example, K color. The second printer driver 13 receives this operation. As a result, the UI unit 26 is activated, and the print setting screen 721 is activated on the display 506 (refer to FIG. 12B).

S6: The user sets "spot color area read and print" 724 to be enabled on the print setting screen. "Spot color area read and print" is a setting for printing the object 71 designated in the spot color area 72 in a spot color. The UI unit 26 receives this setting. Since the setting is saved, it is not required to set the "spot color area read and print" 724 each time. If the "spot color area read and print" 724 is not enabled, the image forming apparatus 30 performs normal printing (converts RGB into CMYK). The user can perform other settings, such as combined and double-sided, as in normal printing in which a spot color is not used.

S7: The user closes the print setting screen 721 and presses the print button 702 to start printing. The UI unit 26 receives the pressing of the print button 702.

S7.1: First, since "spot color area read and print" is enabled, the area information reading unit 28 of the drawing unit 27 reads the area information from the predetermined storage region 14.

S7.2: Since "spot color area read and print" is enabled, the first print data generation unit 29 converts the area information into print data (area information command) described in PDL that can be interpreted by the image forming apparatus 30. The first print data generation unit 29 may include a fact that "spot color area read and print" is enabled in the command. Therefore, the image forming apparatus 30 can detect that the object 71 designated in the spot color area 72 is printed in the spot color. Alternatively, the area information command may also be used to indicate that "spot color area read and print" is enabled.

S7.3: The second print data generation unit 31 generates print data described in PDL by reflecting the print settings on the document data in FIG. 9 displayed by the application software.

S7.4: The first communication unit 32 transmits the area information command and the print data to the image forming apparatus 30. After the procedure, the image forming apparatus 30 prints the print data.

Screen Displayed by Information Processing Apparatus

Hereinafter, the screen referred to in the sequence diagram of FIG. 8 will be described. FIG. 9 is an example of a document screen 731 on which a document created by application software is displayed. In FIG. 9, a document 733 edited by the user is displayed in a work area 732 of the application software. The content of this document is merely an example.

In the present embodiment, it is assumed that this application software is application software that cannot designate a spot color (application software that can handle only RGB). However, an embodiment of the present disclosure can also be applied to application software that can designate a spot color.

The user writes the object 71, which is to be printed in a spot color, in a part of the document. In FIG. 9, an image code is described as the object 71 at the lower left of the document. The image code may be described anywhere, but a location not overlapping other objects 71 is preferable. This is because only the object 71 to be printed in a spot color is extracted from the C, M, and Y plane images 81 (other objects are also extracted if overlap occurs).

For the same reason, it is preferable that the object 71 to be printed in a spot color is described at a location where the background is plain. This is because, otherwise, the background is also extracted at the time of extraction from the C, M, and Y plane images 81 and the background is also printed in a spot color. However, when the background color is light, only the object 71 to be printed in a spot color can be extracted by binarization after extraction.

The object 71 to be printed in a spot color may have any size, and the object 71 to be printed in a spot color may be described in a large size on the entire surface of the document. The object 71 to be printed in a spot color may be any object that can be expressed in a two-dimensional manner. Information included in the image code includes a creator's user name, serial number, creation date and time, and identification information of the information processing apparatus 10. Any information may be included in the image code.

The color of the object 71 to be printed in a spot color displayed by the application software is the color of the spot color material at the time of printing. Therefore, the object 71 to be printed in a spot color may be described in any color in the application software. Even if one object 71 is described in a plurality of colors, the color of the object 71 is the color of the spot color material at the time of printing. In other words, the object 71 designated in the spot color area 72 becomes the object 71 to be printed in a spot color. The number of objects 71 to be printed in a spot color may be plural.

Figure 10:
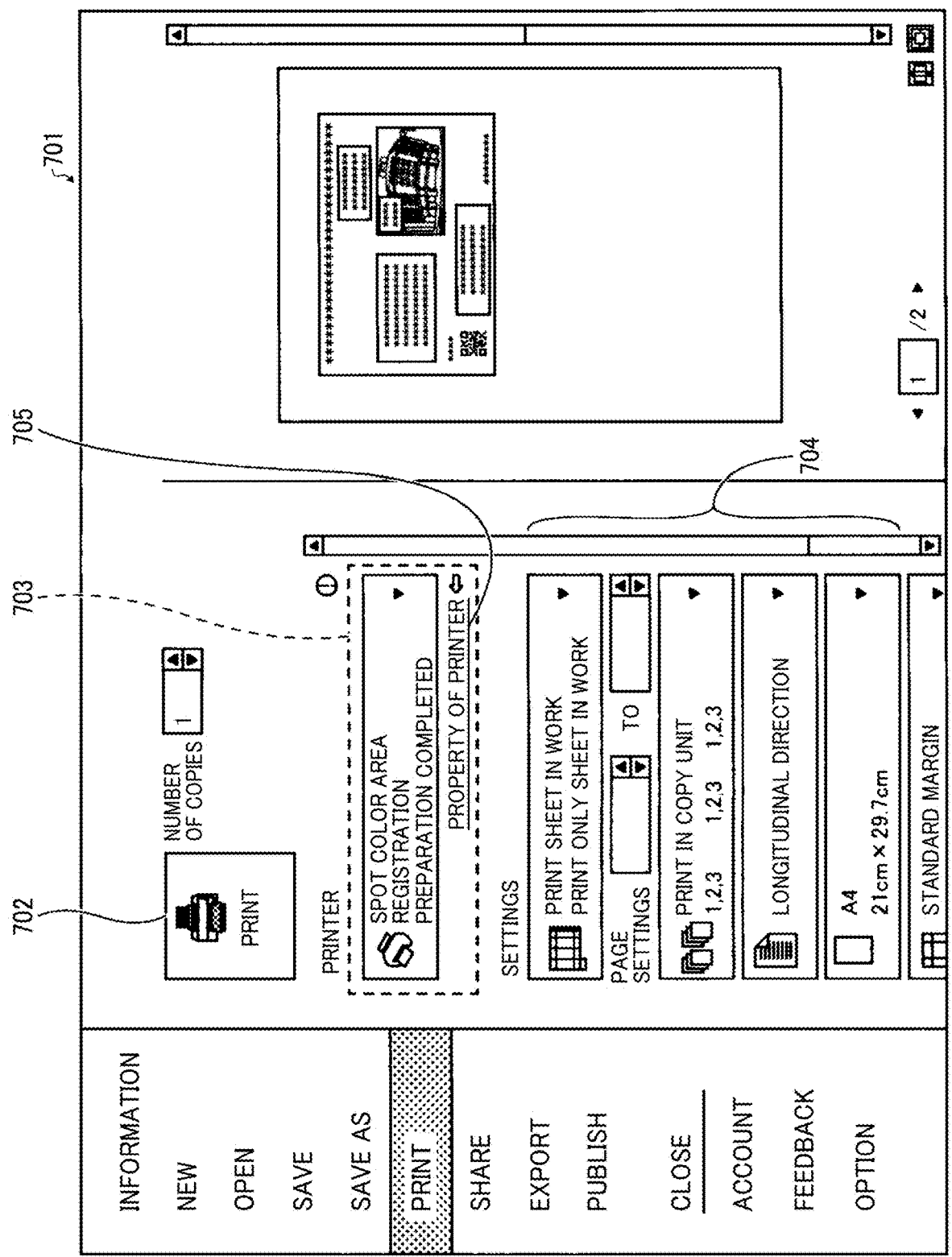
FIG. 10 is an example of a print screen for a user to print a document displayed by application software.

FIG. 10 is an example of the print screen 701 for a user to print a document displayed by application software. The print screen 701 has the print button 702, a printer selection button 703, other setting buttons 704, and the property button 705. First, the printer selection button 703 is a button for the user to select the image forming apparatus 30 to be used for printing a document (image forming apparatus 30 selected here may not be present). The user selects the image forming apparatus 30 from which the first printer driver 11 capable of designating the spot color area 72 is called. The image forming apparatus 30 is known to the user.

The print button 702 is a button for calling a printer driver. When the user presses the print button 702 in a state in which the appropriate image forming apparatus 30 is selected, the first printer driver 11 is called and executed.

The other setting buttons 704 are buttons for the user to set page designation, copy unit printing, printing direction, paper size, and the like. However, since the first printer driver 11 does not perform actual printing, such a setting is not required.

The property button 705 is a button for displaying a print setting screen of the image forming apparatus 30. The user can set detailed print settings that cannot be set on the print screen 701.

FIG. 11 is an example of the preview screen 711 displayed on the display 506 by the preview application 12. The preview screen 711 has a page designation field 712, an OK button 713, a cancel button 714, and a preview region 715. The preview region 715 is a region for displaying a print image 715a of a document on the screen. The page designation field 712 is a field for the user to designate a page for displaying the print image 715a in the preview region 715. The OK button 713 is a button for the user to end the preview application 12 and for the area information storage unit 25 to store the area information in the storage region 14 (return to FIG. 9). The cancel button 714 is a button for returning to the print screen 701.

The user operates a pointing device to set one or more spot color areas 72 and one or more destination areas 74 in the preview region 715. The upper limit of the number of spot color areas 72 is set to N, but there may be no upper limit. The spot color area 72 and the destination area 74 are set as a pair, but the destination area 74 is not required. As described with reference to FIG. 9, the object 71 included in the spot color area 72 becomes the object 71 to be printed in a spot color.

The user clicks the upper left corner of a region to be designated in the spot color area 72 and drags to the lower right corner. The rectangular region designated at the upper left corner and the lower right corner is the spot color area 72. The preview displaying unit 23 highlights the spot color area 72, for example, by displaying the spot color area 72 with a dotted frame 77. When designating the destination area 74, the user drags the dotted frame 77 indicating the spot color area 72 and drops the dotted frame 77 at the destination. The user can also enlarge or reduce the destination area 74 more than the spot color area 72. In this case, the destination area 74 is enlarged or reduced by clicking the dotted frame 77 dropped at the destination to make a selection state. The user can rotate the destination area 74. In this case, the operation receiving unit 24 can receive the rotation angle when the dotted frame 77 dropped at the destination is clicked to make a selection state.

Figure 12A:
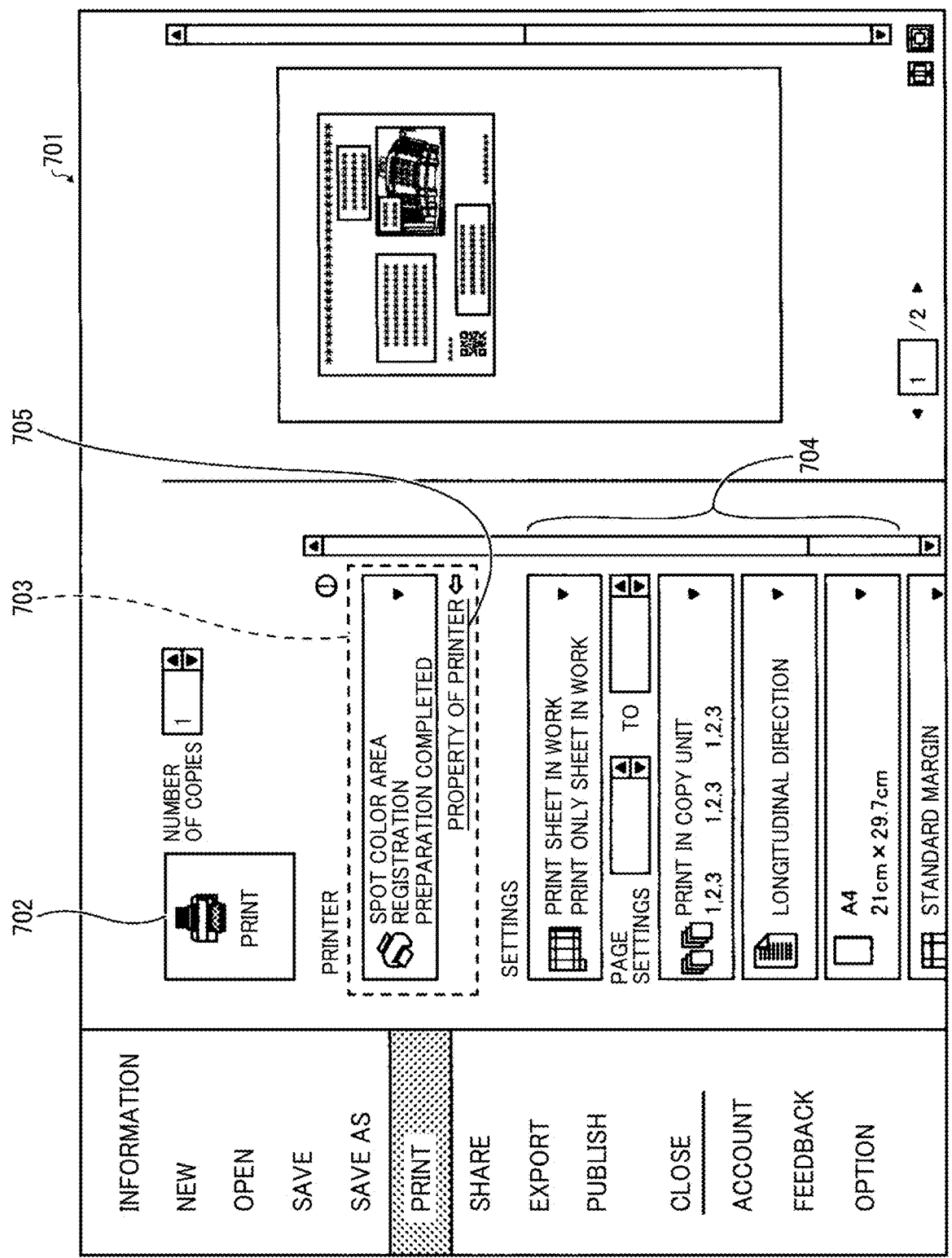
FIGS. 12A and 12B are examples of a print screen and a print setting screen of a second printer driver.
Figure 12B:
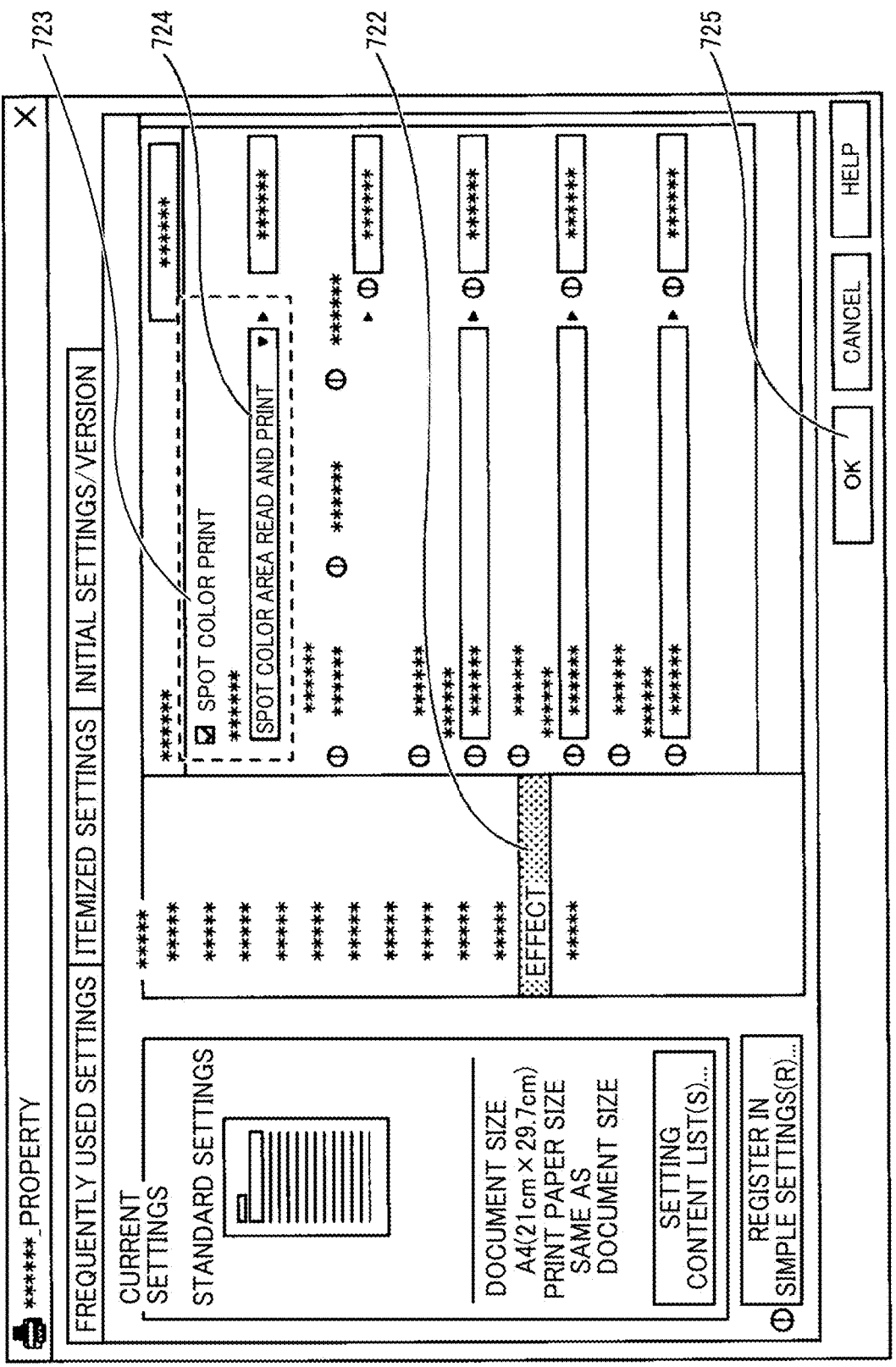

FIGS. 12A and 12B illustrate examples of the print screen 701 and the print setting screen 721 of the second printer driver 13. When the OK button 713 is pressed on the preview screen 711 in FIG. 11, the print screen 701 illustrated in FIG. 12A is displayed. The print screen 701 is the same as in FIG. 10, but a printer selected by the user is different. The user who has designated the area information on the preview screen 711 selects the image forming apparatus 30 in which a spot color is assigned to K. The image forming apparatus 30 is known to the user.

When the image forming apparatus 30 is selected, settings relevant to the spot color material are possible. The user presses the property button 705 to display the print setting screen 721 illustrated in FIG. 12B on the display 506. The user sets "spot color area read and print" to be enabled by selecting "effect" 722, checking a check button 723 of spot color printing, and selecting a "spot color area read and print" 724. When the user presses an OK button 725, the print setting screen 721 returns to the print screen 701.

When the user presses the print button 702 on the print screen 701, the second printer driver 13 corresponding to the image forming apparatus 30 in which a spot color is assigned to K is called and executed. Therefore, print data is created and transmitted to the image forming apparatus 30.

The user can set page designation, copy unit printing, printing direction, paper size, and the like with the other setting buttons 704, and can also set double-sided printing, combined printing, and the like on the print setting screen 721.

Figure 13:
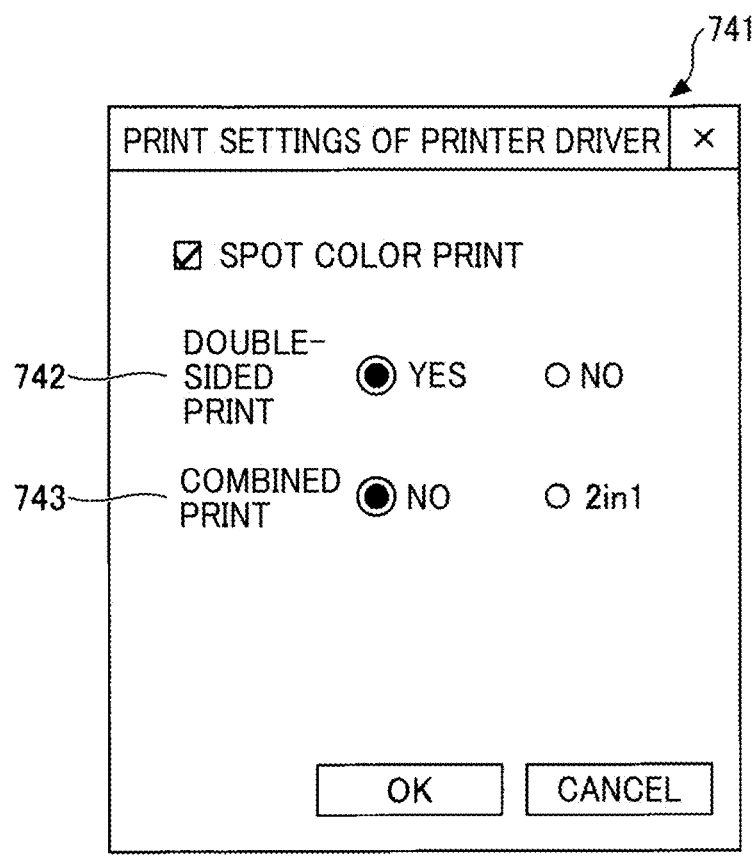
FIG. 13 is a diagram illustrating a double-sided combined setting screen on which print settings relevant to double-sided and combined are performed.

FIG. 13 is a diagram illustrating a double-sided combined setting screen 741 on which print settings relevant to double-sided and combined are performed. The double-sided combined setting screen 741 has a double-sided print setting field 742 and a combined print setting field 743. The user can set "Yes" or "No" by radio buttons.

When the combined printing is "Yes", a plurality of documents is printed on one paper. Therefore, the coordinates of the spot color area 72 and the destination area 74 are changed. Details will be described with reference to FIGS. 15A and 15B.

Print Data Generated from Area Information

Next, area information (spot color area 72 and destination area 74) set on the preview screen 711 by the user and print data (area information command) generated from the area information will be described.

FIG. 14A illustrates an example of area information stored in the storage region 14 by the area information storage unit 25. Descriptions D1 and D2 each indicate one piece of area information. The contents of the descriptions D1 and D2 are as follows. "src_x" is the X coordinate of the upper left corner of the spot color area 72. "src_y" is the Y coordinate of the upper left corner of the spot color area 72. "width" is the width (pixel) of the spot color area 72. "height" is the height (pixel) of the spot color area 72. "dst_x" is the X coordinate of the upper left corner of the destination area 74. "dst_y" is the Y coordinate of the upper left corner of the destination area 74. "dst_width" is the width (pixel) of the destination area 74. "dst_height" is the height (pixel) of the destination area 74. "rot" is the rotation angle (clockwise) of the destination area 74 with respect to the spot color area 72.

Figure 14B:
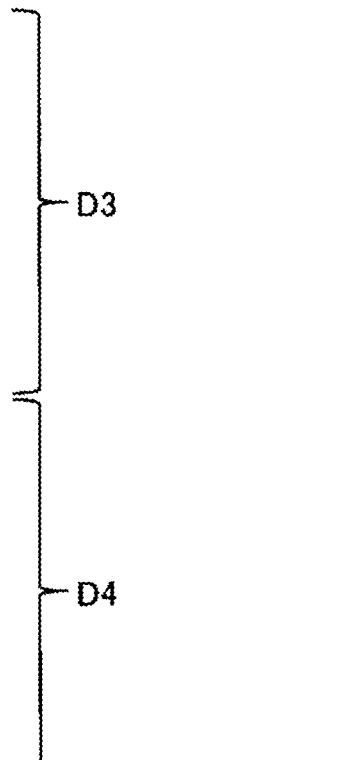

FIG. 14B is an example of print data (area information command) in which area information read from the storage region 14 by the first print data generation unit 29 is described in PDL. The description D3 in FIG. 14B is print data generated from the description D1 in FIG. 14A, and the description D4 in FIG. 14B is print data generated from the description D2 in FIG. 14A.

The image forming apparatus 30 in which a spot color is assigned to K corresponds to the area information command, and can move the object 71 in the spot color area 72 to the destination area 74. Although the print data of the document is described subsequent to the area information command in FIG. 14B, the location of the area information command may be anywhere.

Figure 15A:
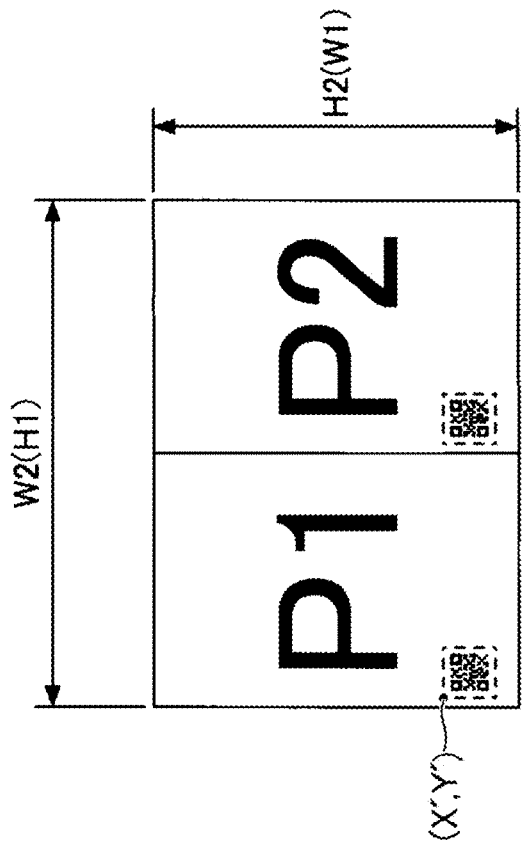
FIGS. 15A and 15B are diagrams illustrating the coordinates of a destination area when combined printing is set.
Figure 15B:
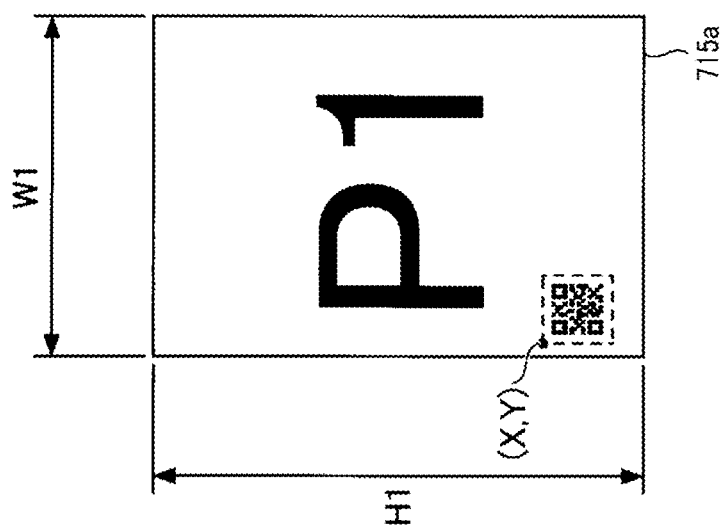

FIGS. 15A and 15B are diagrams illustrating the coordinates of the destination area when combined printing is set. FIG. 15A schematically illustrates the spot color area 72, and FIG. 15B is a diagram illustrating the coordinates of the spot color area 72 when combined printing is set. In the area information stored in the area information storage unit 25, coordinate information in a case where combined is not applied is described.

The first print data generation unit 29 of the second printer driver 13 converts the coordinates of the spot color area 72 in FIG. 15A into coordinates after combination. It is assumed that the coordinates of the upper left corner of the spot color area 72 before the conversion are (X, Y) and the coordinates of the upper left corner of the spot color area 72 after the conversion are (X', Y'). It is assumed that the width and height of the print image 715a displayed as a preview are W1 is H1, respectively. It is assumed that the width and height of the paper is W2 is H2, respectively. Therefore, W2=H1 and H2=W1.

The coordinates (X', Y') of the upper left corner of the spot color area 72 after the conversion are expressed as follows using the coordinates (X, Y) of the upper left corner of the spot color area 72 before the conversion: X'=(W2/2)×(X/W1)Y'=H2×(Y/H1). The first print data generation unit 29 also converts the coordinates of the destination area 74 in a similar manner.

In FIG. 15B, the objects 71 in the spot color area 72 may be completely the same or different. For example, if the user desires to include the serial number in the image code, the user sets a different image code for each page.

Operation Procedure of Image Forming Apparatus

Figure 16:
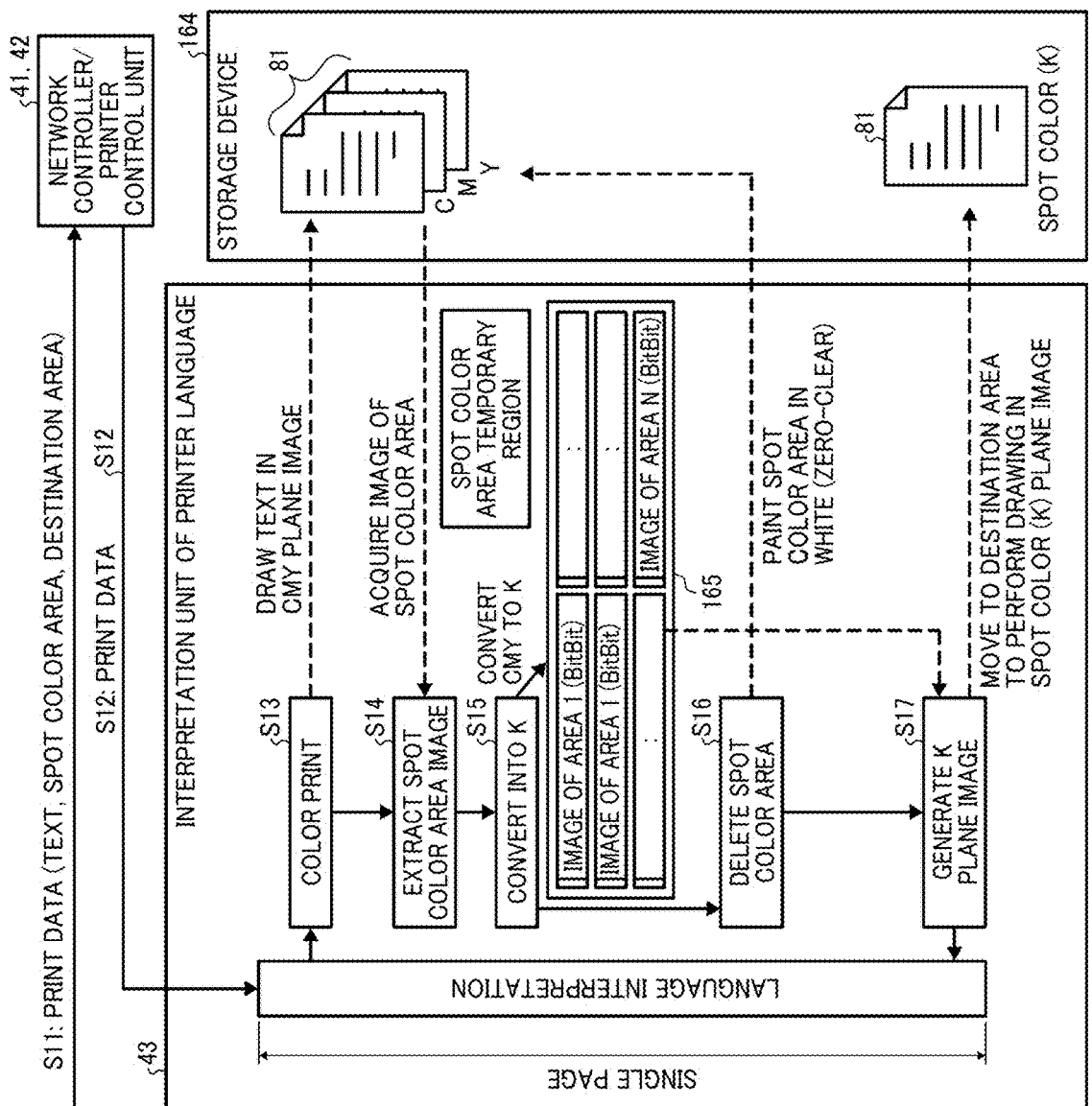
FIG. 16 is a flowchart of a procedure in which an image forming apparatus prints an object designated in a spot color, and is a diagram schematically illustrating various kinds of data used in this procedure.

Next, a procedure in which the image forming apparatus 30 that has received print data prints an object with a spot color will be described with reference to FIG. 16. FIG. 16 is a flowchart of a procedure in which the image forming apparatus 30 prints an object designated in a spot color using a spot color material, and is a diagram schematically illustrating various kinds of data used in this procedure.

S11: The second printer driver 13 transmits print data. The print data includes a text 161 of the document, coordinates 162 of the spot color area 72, and coordinates 163 of the destination area 74. The second communication unit 41 of the image forming apparatus 30 receives the print data. Based on the coordinates 162 of the spot color area 72 and the coordinates 163 (area information command) of the destination area 74 included in the print data or the fact that the object is to be printed in a spot color, the printer control unit 42 starts control to print the designated object in the spot color.

S12: The printer control unit 42 acquires the print data from the second communication unit 41, and requests the printer language interpretation unit 43 to interpret the print data.

The printer language interpretation unit 43 performs the following processing in units of pages.

S13: First, the plane data drawing unit 44 of the printer language interpretation unit 43 performs color printing. Color printing refers to performing the above-described color matching processing and screening processing to generate the plane images 81 of C, M, and Y colors. The K plane image 81 is not generated. The C, M, and Y plane images 81 are stored in a storage device 164 (for example, the MEM-C 907 or the HD 909) of the image forming apparatus 30.

S14: Then, the spot color image control unit 45 extracts image data of the spot color area 72 from each of the C, M, and Y plane images 81 based on the spot color area 72 included in the print data. As a result, the shape of the object 71 to be printed in the spot color is obtained.

S15: Then, the plane data conversion unit 46 converts the image data extracted from the spot color area 72 into K. The K image data is stored in a temporary region 165 (for example, the MEM-C 907 or the HD 909) provided for the object 71 in the spot color area 72.

S16: Then, the spot color image control unit 45 deletes (zero clears) the image of the spot color area 72 from each of the C, M, and Y plane images 81 stored in the storage device 164 based on the spot color area 72 included in the print data. This is because the object 71 of the spot color area 72 is printed at the destination and may not be printed in the spot color area 72. However, in a case where the object 71 of the spot color area 72 is also printed, the object 71 of the spot color area 72 may not be deleted.

S17: Then, the spot color image control unit 45 acquires the image data of the object 71 converted into K stored in the temporary region 165, and places the image data of the spot color area 72 converted from CMY to K in the destination area 74 of the K plane image 81 based on the destination area 74 included in the print data. The K plane image 81 is also stored in the storage device 164.

When the printer language interpretation unit 43 generates the C, M, Y, and K plane images 81, notification is provided to the printer control unit 42. Accordingly, the printer control unit 42 executes the printing process to print the C, M, Y, and K plane images 81 on paper.

In the present embodiment, overprint is designated at the time of printing. Overprint refers to performing printing so that another color overlaps one color.

Figure 17:
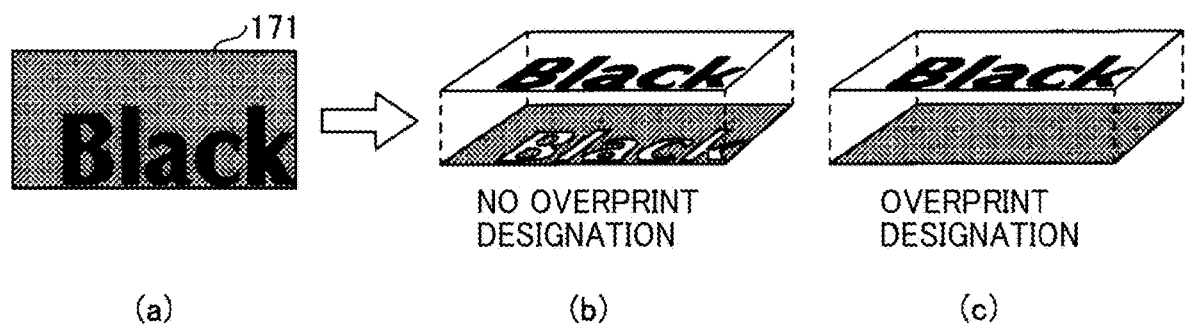
FIG. 17 is an example of a diagram illustrating overprint.

FIG. 17 is an example of a diagram illustrating overprint. Part (a) of FIG. 17 illustrates an output product 171 output from the image forming apparatus 30, and the output product 171 is printed in two colors, C of the background and K of characters (Black). Therefore, in the printing process, the C plane image 81 and the K plane image 81 are created. When there is no overprint designation, as illustrated in part (b) of FIG. 17, the image forming apparatus 30 creates the C plane image 81 by masking (whitening out) the K portion. When there is an overprint designation, as illustrated in part (c) of FIG. 17, the image forming apparatus 30 creates the C plane image 81 without masking (without whitening out) the K portion.

When there is no overprint designation, a gap between the lower color (C in FIG. 17) and the upper color (K in FIG. 17) may be noticeable. When there is an overprint designation, two colors may be mixed and the color displayed by the application software may not be reproduced on the output product 171. Therefore, the presence/absence of overprint designation is set according to a document. However, in the present embodiment, since the spot color is transparent, the lower color (such as a photograph) is whitened out without overprint designation. On the other hand, since the spot color is transparent, a change in color is unlikely to occur even if there is an overprint designation. Therefore, in the present embodiment, since there is an overprint designation, the K plane image 81 to which the spot color is assigned is printed. There may be no overprint designation for C, M, and Y.

In the case of the image forming apparatus 30 capable of designating a spot color, the processing illustrated in FIG. 16 is modified as follows.

Figure 18:
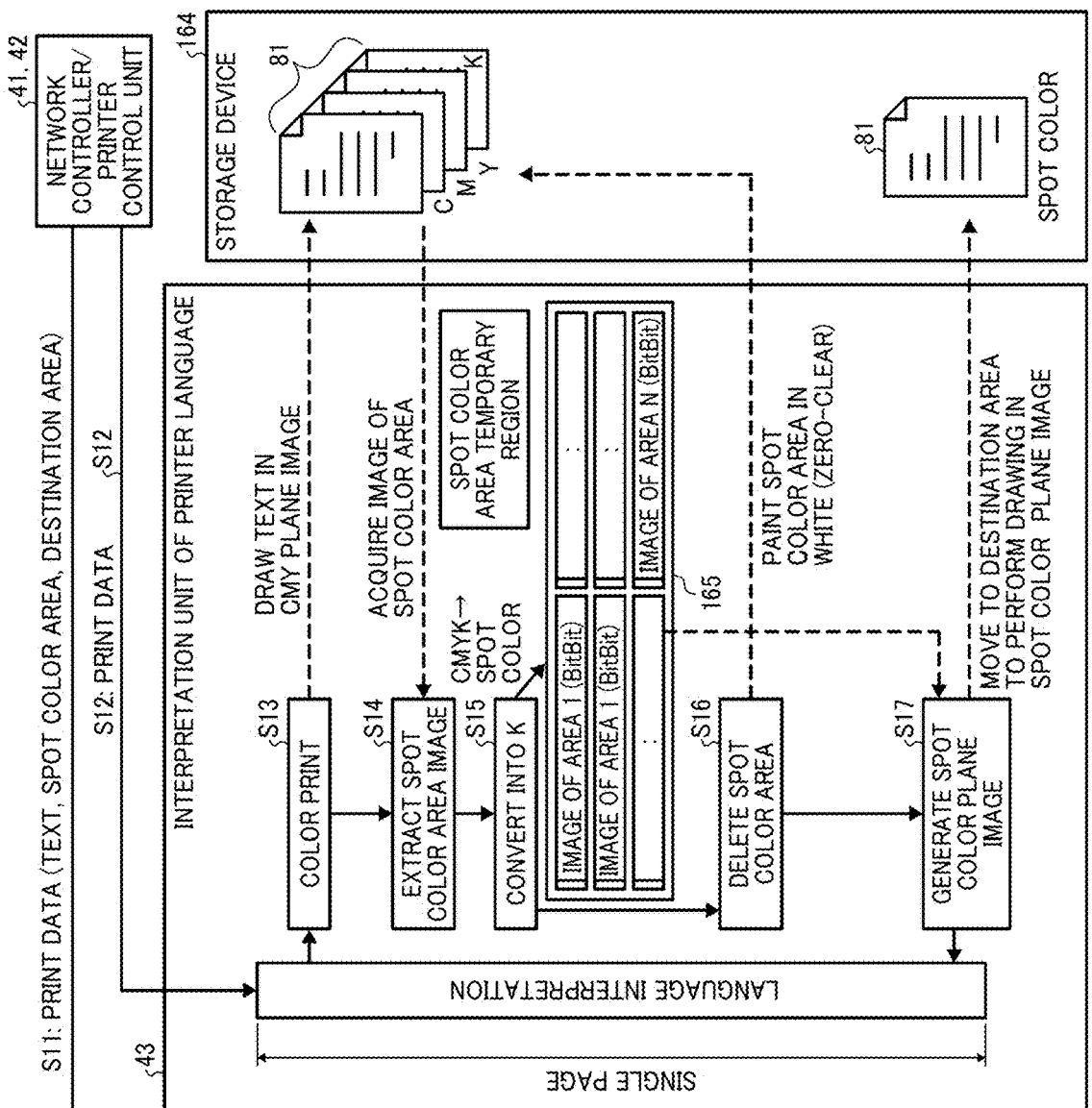
FIG. 18 is a flowchart of a procedure in which an image forming apparatus prints an object designated in a spot color using a spot color material in the case of an image forming apparatus capable of designating a spot color, and is a diagram schematically illustrating various kinds of data used in this procedure.

FIG. 18 is a flowchart of a procedure in which the image forming apparatus 30 prints an object designated in a spot color using a spot color material in the case of the image forming apparatus 30 capable of designating a spot color, and is a diagram schematically illustrating various kinds of data used in this procedure. In the description of FIG. 18, differences from FIG. 16 will mainly be described. The image forming apparatus 30 illustrated in FIG. 18 is an image forming apparatus capable of designating a spot color separately from C, M, Y, and K. The K toner does not absorb infrared light.

The processing of steps S11 and S12 is the same as in FIG. 16. In step S13, the plane data drawing unit 44 of the printer language interpretation unit 43 generates not only the plane image 81 of each color of C, M, and Y but also the plane image 81 of K.

In step S14, the spot color image control unit 45 extracts image data of the spot color area 72 from each of the C, M, Y, and K plane images 81 based on the spot color area 72 included in the print data.

In step S15, the plane data conversion unit 46 converts the image data extracted from the spot color area 72 into the spot color. The spot color is transparent, but is a primary color other than C, M, Y, and K that can be designated in the image forming apparatus 30.

The processing of step S16 is the same as in FIG. 16. In step S17, the spot color image control unit 45 acquires the image data of the object 71 converted into the spot color stored in the temporary region 165, and places the image data of the spot color area 72 converted from CMYK to the spot color in the destination area 74 of the spot color plane image 81 based on the destination area 74 included in the print data. The spot color plane image 81 is also stored in the storage device 164.

As described above, since the C, M, Y, and K plane images 81 and the spot color plane image 81 are created, the image forming apparatus 30 prints C, M, Y, and K+spot color.

Print Example

Figure 19:
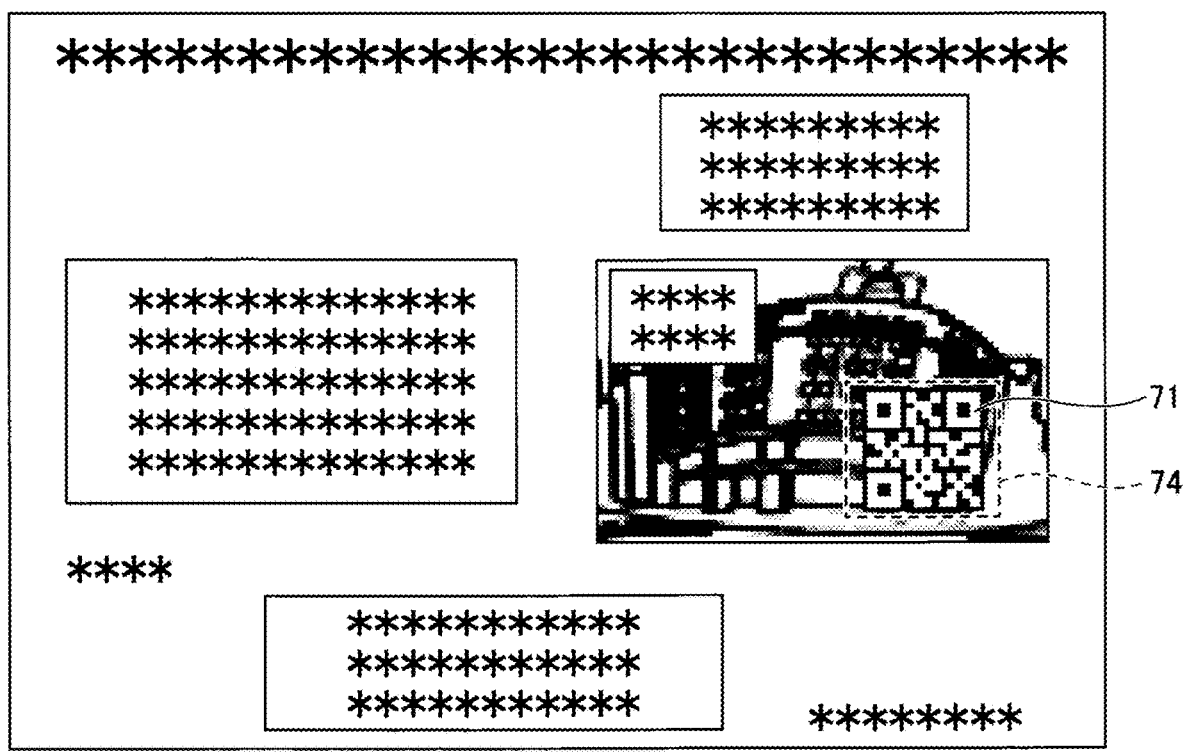
FIG. 19 is a diagram illustrating an example of an output product output from the image forming apparatus.

FIG. 19 is an example of an output product output from the image forming apparatus 30. Although the object 71 was present in the document displayed by application software, the object 71 is deleted from the output product. The object 71 is printed in the destination area 74. Although the object 71 that is output is actually transparent, the object 71 is illustrated in white in FIG. 19 for convenience of drawing.

Summary

As described above, the printing system 100 according to the present embodiment can implement printing using a spot color without the image forming apparatus 30 capable of designating the spot color or application software capable of designating the spot color or both with an operation in which the user calls a printer driver on a general application and designates the spot color area 72 and the destination area 74.

Other Application Examples

While the present disclosure has been described using several embodiments, the present disclosure is not limited to such embodiments, and various modifications and substitutions can be made without departing from the spirit of the present disclosure.

For example, in the present embodiment, a toner transparent to visible light is printed, but colors other than C, M, Y, and K, such as gold, silver, and white, may be printed.

In the present embodiment, the object 71 printed in a spot color is described in a document to be printed. However, the object 71 printed in the spot color may be prepared as a document different from the document to be printed. In this case, it is preferable to use merge printing. In this case, the user writes the file name of the object in another document, and saves the file of the object with the same file name. By executing the merge printing with the file name designated in the document to be printed, the object can be printed at any location of the document to be printed. This is convenient in a case where a plurality of documents is printed but objects of the documents are preferably different.

In the present embodiment, the printing mainly using the electrophotography technique has been described. However, an embodiment of the present disclosure can also be appropriately applied to a printing apparatus using an inkjet technique for discharging droplets.

In the configuration examples illustrated in FIGS. 6 and 7 and the like, the configuration is divided according to main functions in order to facilitate understanding of the processing of the information processing apparatus 10 and the image forming apparatus 30. The present disclosure is not limited by the name or method for dividing the processing unit. The processing of the information processing apparatus 10 and the image forming apparatus 30 can be divided into more processing units according to the processing content. The processing of the information processing apparatus 10 and the image forming apparatus 30 can also be divided so that one processing unit includes more processing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

The invention claimed is:

1. An image forming apparatus for performing printing in a plurality of colors, the image forming apparatus comprising processing circuitry configured to:
receive first print data in which an object to be printed in a spot color is designated in a first area in a document to be printed and second print data of the document to be printed from an information processing apparatus;
convert the second print data received, into image data of a predetermined color;
extract an image of the first area from the image data obtained by conversion of the second print data;
convert the image of the first area extracted, into the spot color; and
generate image data of the spot color in which the image of the first area converted is placed.

2. The image forming apparatus according to claim 1, wherein the processing circuitry receives the first print data including the first area and a second area in the document to be printed from the information processing apparatus, and
places the image of the first area converted, in the second area to generate the image data of the spot color.

3. The image forming apparatus according to claim 2, wherein the processing circuitry deletes the image of the first area from the image data of the predetermined color.

4. The image forming apparatus according to claim 1, wherein the processing circuitry overprints the image data of the spot color with respect to the image data of the predetermined color.

5. The image forming apparatus according to claim 1, wherein the spot color is transparent to visible light.

6. A printing system comprising:
an information processing apparatus configured to request printing of a document displayed by application software to an image forming apparatus,
the information processing apparatus including processing circuitry configured to:
receive an object to be printed in a spot color by designation of a first area in a document to be printed;
convert information regarding the first area into first print data in which the object to be printed in the spot color is designated in the first area in the document to be printed;
convert the document to be printed into second print data; and
transmit the first print data and the second print data to the image forming apparatus; and
the image forming apparatus including processing circuitry configured to:
receive the first print data and the second print data from the information processing apparatus;
convert the second print data received, into image data of a predetermined color;
extract an image of the first area from the image data obtained by conversion of the second print data;
convert the image of the first area extracted, into the spot color; and
generate image data of the spot color in which the image of the first area converted is placed.

7. A non-transitory storage medium storing computer readable program code for causing an information processing apparatus to execute a process of requesting printing of a document displayed by application software to an image forming apparatus, the process comprising:
receiving an object to be printed in a spot color by designation of a first area in a document to be printed;
converting information regarding the first area received by the receiving into first print data;
converting the document to be printed into second print data; and
transmitting the first print data and the second print data to the image forming apparatus.

8. The non-transitory storage medium according to claim 7,
wherein the process includes:
receiving designation of a second area in the document to be printed; and
converting the information regarding the first area and information regarding the second area received by the receiving into the first print data.

9. The non-transitory storage medium according to claim 7,
wherein the process includes:
displaying a preview screen of the document to be printed; and
receiving designation of the first area on the preview screen.

10. The non-transitory storage medium according to claim 8,
wherein the process includes:
displaying a preview screen of the document to be printed; and
receiving designation of the first area and the second area on the preview screen.

11. The non-transitory storage medium according to claim 10,
wherein the process includes:
receiving designation of the second area larger or smaller than the first area or a rotation angle of the second area with respect to the first area; and
converting the information regarding the second area including a size of the second area or the rotation angle into the first print data.

12. The non-transitory storage medium according to claim 10,
wherein the process includes converting coordinates of the first area and the second area into coordinates after combination when a setting for combined printing of the document to be printed is received.

13. The non-transitory storage medium according to claim 10,
wherein the designation of the first area and the second area on the preview screen of the document to be printed is received by a first printer driver called from the application software, the information regarding the first area and the information regarding the second area are stored into a storage region of the information processing apparatus by the first printer driver, the information regarding the first area and the information regarding the second area are read from the storage region in the information processing apparatus by a second printer driver called from the application software, the information regarding the first area and the information regarding the second area are converted into first print data by the second printer driver, and the document to be printed is converted into the second print data by the second printer driver.

* * * * *